(12) United States Patent
Mahesh

(10) Patent No.: US 11,854,038 B1
(45) Date of Patent: Dec. 26, 2023

(54) MULTI-PARTY, MULTI-POINT TYPE DECENTRALIZED LOYALTY SYSTEM FOR PROMOTION AND POINT ISSUANCE USING A PERMISSION-BASED DISTRIBUTED LEDGER FOR PROMOTION, POINT ISSUANCE, AND POINT REDEMPTION

(71) Applicant: Balan Mahesh, Chandler, AZ (US)

(72) Inventor: Balan Mahesh, Chandler, AZ (US)

( * ) Notice: Subject to any disclaimer, the term of this patent is extended or adjusted under 35 U.S.C. 154(b) by 0 days.

(21) Appl. No.: 17/349,745

(22) Filed: Jun. 16, 2021

Related U.S. Application Data

(60) Provisional application No. 63/039,838, filed on Jun. 16, 2020.

(51) Int. Cl.
*G06Q 30/0226* (2023.01)

(52) U.S. Cl.
CPC ..... *G06Q 30/0226* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 2018/0268401 | A1* | 9/2018 | Ortiz | G06Q 20/326 |
| 2019/0026821 | A1* | 1/2019 | Bathen | G06Q 40/00 |
| 2019/0081789 | A1* | 3/2019 | Madisetti | G06Q 20/401 |
| 2019/0108543 | A1* | 4/2019 | Chan | G06Q 30/0229 |
| 2019/0156363 | A1* | 5/2019 | Postrel | H04L 67/2833 |
| 2020/0341951 | A1* | 10/2020 | Oberhofer | H04L 63/0428 |
| 2021/0184850 | A1* | 6/2021 | Shpurov | H04L 9/14 |

OTHER PUBLICATIONS

Transcript and Screen captures from YouTube video clip entitled "Pravici Blockchain Offering—Tokenized Loyalty Points (TLP) full length presentation," 20 pages, uploaded on Sep. 24, 2018, by user "Pravici". Retrieved from Internet on Nov. 10, 2021: <URL:https://www.youtube.com/watch?v=F5MXuOJqo7g> (Year: 2018).*

Transcript and Screen captures from YouTube video clip entitled "Oracle Open World 2018 demo recording" 7 pages, uploaded on Oct. 24, 2018, by user "Pravici". Retrieved from Internet on Nov. 10, 2021: <URL:https://www.youtube.com/watch?v=6p8nDpse8zg> (Year: 2018).*

(Continued)

*Primary Examiner* — Bion A Shelden
(74) *Attorney, Agent, or Firm* — Plager Schack LLP; Mark H. Plager; Stephen Hallberg

(57) ABSTRACT

A multi-party, multi-point type decentralized loyalty system and associated processes for promotion and point issuance using a permission-based distributed ledger are disclosed for promotion and point issuance across multiple point/promotion issuers and redeemers via a permission-based distributed ledger. This system allows an issuer and a set of partners to gain transparent access to both (a) the rules of the system in the form of promotions and exchange rates defined in a distributed ledger and (b) consumer accrual and redemption transactions posted to the distributed ledger, and thereby to allow the complete coalition to operate in a decentralized fashion, with quick on-boarding of new partners and transparent reconciliation of point balances between partner and issuer.

14 Claims, 18 Drawing Sheets

(56) References Cited

OTHER PUBLICATIONS

Pravici Loyalty on the Blockchain. Pravici.com. Archived on Apr. 6, 2019. Retrieved from internet archive on Nov. 10, 2021. <URL: https://web.archive.org/web/20190406145504/https://pravici.com/> (Year: 2019).*

M. Agrawal, D. Amin, H. Dalvi and R. Gala, "Blockchain-based Universal Loyalty Platform," 2019 International Conference on Advances in Computing, Communication and Control (ICAC3), 2019, pp. 1-6, doi: 10.1109/ICAC347590.2019.9036772. (Year: 2019).*

Hyperledger-fabricdocs Documentation Release master. Dec. 25, 2018. Chapters 1, 2, and 4. Retrieved from the internet on Nov. 10, 2021. <URL: https://fabric-v05.readthedocs.io/_/downloads/en/latest/pdf/> (Year: 2018).*

R. James. Hyperledger Fabric—Most Popular Hyperledger Framework. Jun. 8, 2019. Hackernoon. Retrieved from the internet on Nov. 11, 2021. <URL: https://hackernoon.com/hyperledger-fabric-the-most-popular-hyperledger-framework-b4485dea6a2c> (Year: 2019).*

L Coleman. American Express Taps Hyperledger Blockchain for Rewards Program Revamp. CCN. May 25, 2018. [retrieved from internet archive on Apr. 8, 2023] <URL:https://web.archive.org/web/20180524234512/https://www.ccn.com/american-express-taps-hyperledger-blockchain-for-rewards-program-revamp/> (Year: 2018).*

Hyperledger 2. Mindtree's dual solutions for revolutionizing loyalty programs using Hyperledger Fabric. Jun. 16, 2020. [retrieved from internet on Apr. 8, 2023] <URL: https://www.hyperledger.org/blog/2020/06/16/mindtrees-dual-solutions-for-revolutionizing-loyalty-programs-using-hyperledger-fabric> (Year: 2020).*

Hyperledger 3. Case Study: How Mindtree revolutionized loyalty platforms and merchant oboarding with Hyperledger Fabric. [retrieved on Apr. 8, 2023] <URL: https://www.hyperledger.org/wp-content/uploads/2020/06/Hyperledger_CaseStudy_Mindtree_Printable.pdf> (Year: 2020).*

Transcript and Screen captures from YouTube viudeo clip entitled "5—Pravici Tokenized Loyalty Points (TLP) applied to a Mobility use-case", 6 pages, uploaded on Oct. 21, 2019, by user "Pravici". [retrieved from internet on Apr. 8, 2023] <URL: https://www.youtube.com/watch?v=PsVckkRUePw> (Year: 2019).*

* cited by examiner ly system for promotion and point issuance uses the permission-based distributed ledger for promotion, point issuance, and point redemption connected with one or more loyalty programs.

MULTI-PARTY, MULTI-POINT TYPE DECENTRALIZED LOYALTY SYSTEM FOR PROMOTION AND POINT ISSUANCE USING A PERMISSION-BASED DISTRIBUTED LEDGER FOR PROMOTION, POINT ISSUANCE, AND POINT REDEMPTION

CLAIM OF BENEFIT TO PRIOR APPLICATION

This application claims benefit to U.S. Provisional Patent Application 63/039,838, entitled "MULTI-PARTY, MULTI-POINT TYPE DECENTRALIZED LOYALTY SYSTEM FOR PROMOTION AND POINT ISSUANCE USING A PERMISSION-BASED DISTRIBUTED LEDGER FOR PROMOTION AND POINT ISSUANCE VIA THE PERMISSION-BASED DISTRIBUTED LEDGER," filed Jun. 16, 2020. The U.S. Provisional Patent Application 63/039,838 is incorporated herein by reference.

BACKGROUND

Embodiments of the invention described in this specification relate generally to loyalty and point promotion systems, and more particularly, to a multi-party, multi-point type decentralized loyalty system and associated processes for promotion and point issuance using a permission-based distributed ledger.

When the issuer of loyalty tokens wants to invite a set of partners to participate in the issue and redemption of loyalty points, the burden falls on the issuer to run a centralized system to manage the loyalty program. The partners are unable to control the rules of the system collectively and do not have real-time access to consumer behavior data.

Existing loyalty systems are either centralized with its attendant limitations, or in the case where it is decentralized have used the cryptocurrency features of mining and minting of loyalty points (like a crypto-currency). Using a cryptocurrency or a cryptocurrency like loyalty point system is quite useless because the purpose of a loyalty point system is to influence human behavior by making them accumulate points which can be spent only for goods and services sold by the issuer and coalition of partners. The purpose of cryptocurrency is just like fiat currency, free exchange of the currency for goods and services anywhere. This software is the first one to exploit distributed ledgers to allow a set of partners to define exchange rates, promotions, and point types along with digital wallets to define a truly democratized loyalty application.

Therefore, what is needed is a way to allow an issuer and a set of partners gain transparent access to both (a) the rules of the system in the form of promotions and exchange rates defined in a distributed ledger and (b) consumer accrual and redemption transactions posted to the distributed ledger, and thereby to allow the complete coalition to operate in a decentralized fashion, with quick on-boarding of new partners and transparent reconciliation of point balances between partner and issuer.

BRIEF DESCRIPTION

A novel multi-party, multi-point type decentralized loyalty system and associated processes for promotion and point issuance using a permission-based distributed ledger are disclosed for promotion and point issuance across multiple point/promotion issuers and redeemers via the permission-based distributed ledger. In some embodiments, the multi-party, multi-point type decentralized loyalty system for promotion and point issuance comprises a permission-based distributed ledger, channels, smart contracts (or chain code), state database and transaction ledger, assets, an application programming interface (API) as well as administration tool for partners and issuer, with support for mobile apps and web applications for members. In some embodiments, the multi-party, multi-point type decentralized loyalty system for promotion and point issuance uses the permission-based distributed ledger for promotion, point issuance, and point redemption connected with one or more loyalty programs.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having thus described the invention in general terms, reference is now made to the accompanying drawings, which are not necessarily drawn to scale, and which show different views of different example embodiments.

Figure 1:
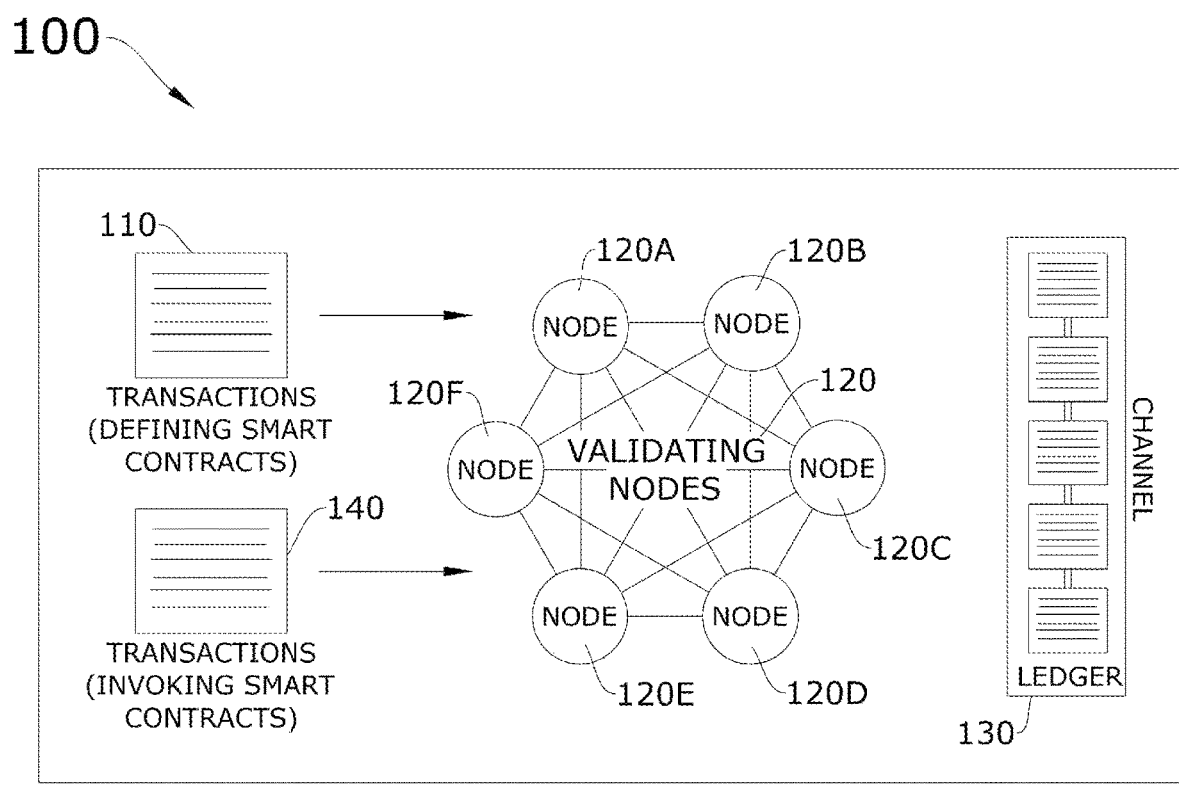

FIG. 1 conceptually illustrates a schematic view of a permissioned distributed ledger in some embodiments of the multi-party, multi-point type decentralized loyalty system with a set of computing device nodes to endorse loyalty transactions.

Figure 2:
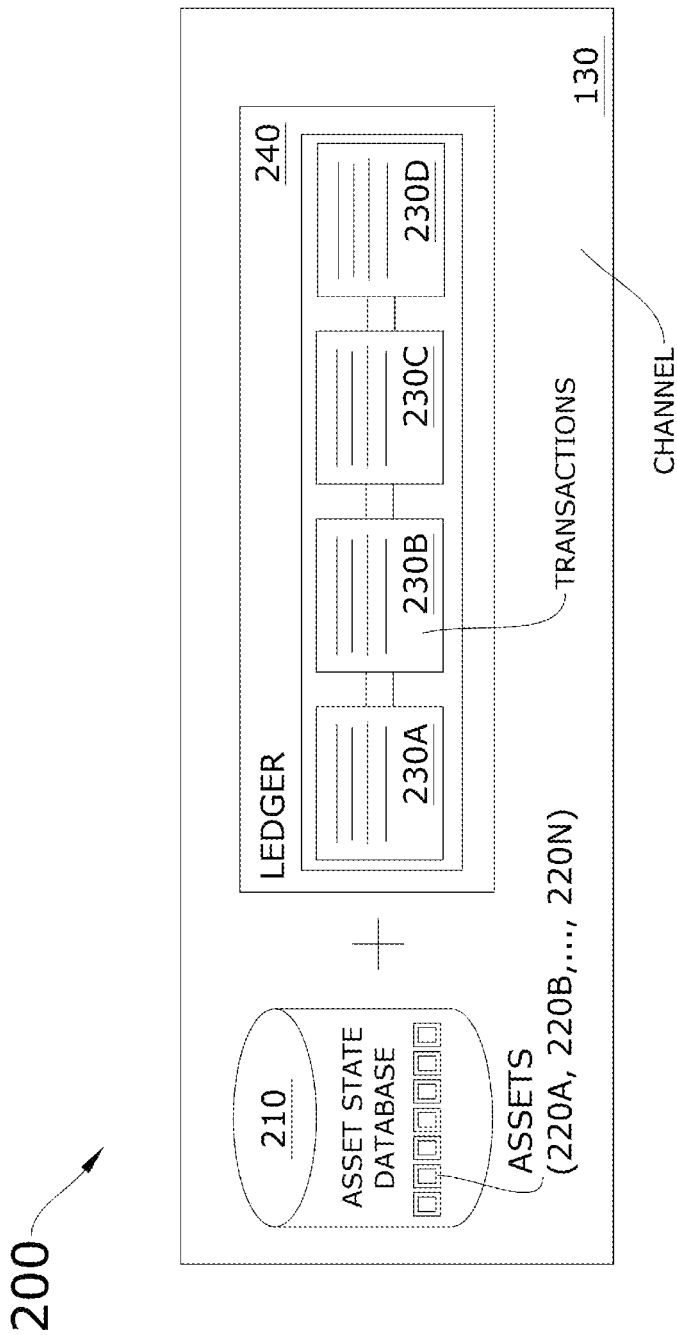

FIG. 2 conceptually illustrates a schematic view of a channel in some embodiments of the multi-party, multi-point type decentralized loyalty system with a state database and a blockchain with a chain of transaction blocks.

Figure 3:
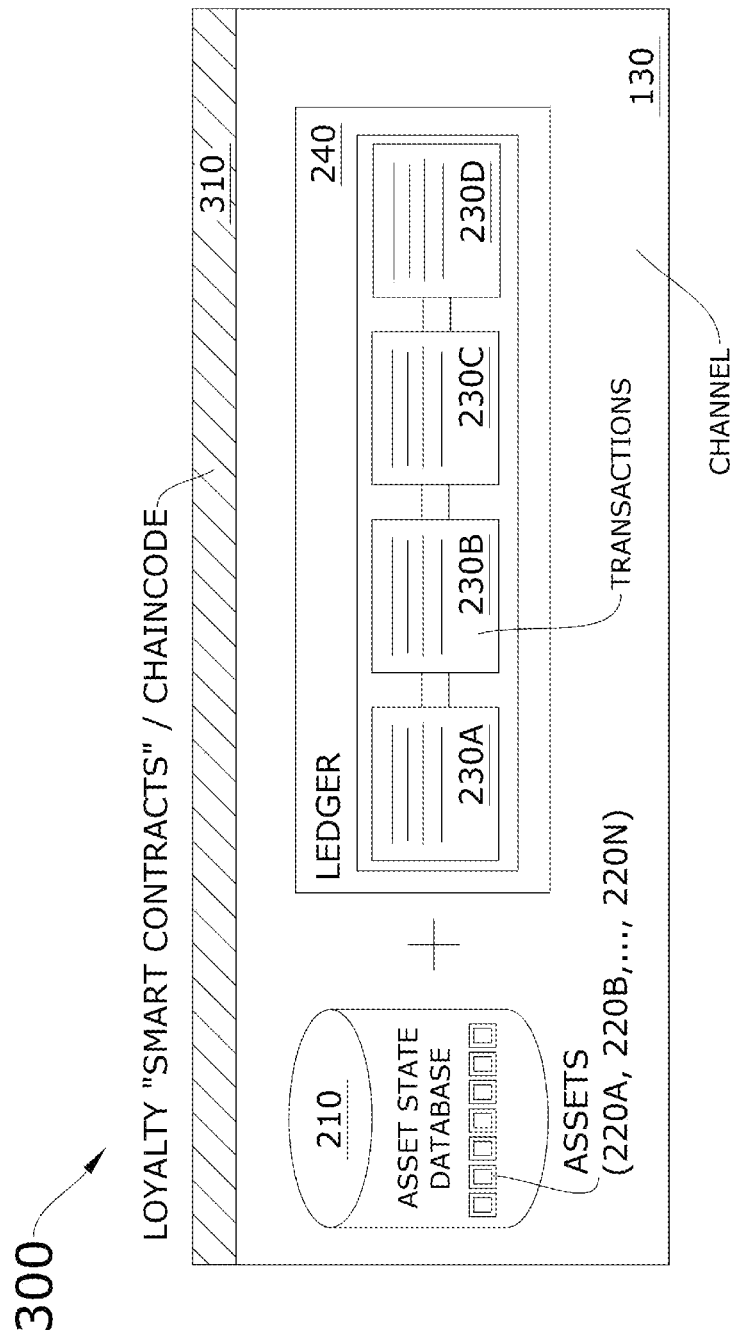

FIG. 3 conceptually illustrates a schematic view of smart contracts for the channel that define loyalty rules that govern asset state changes in the state database in some embodiments of the multi-party, multi-point type decentralized loyalty system.

Figure 4:
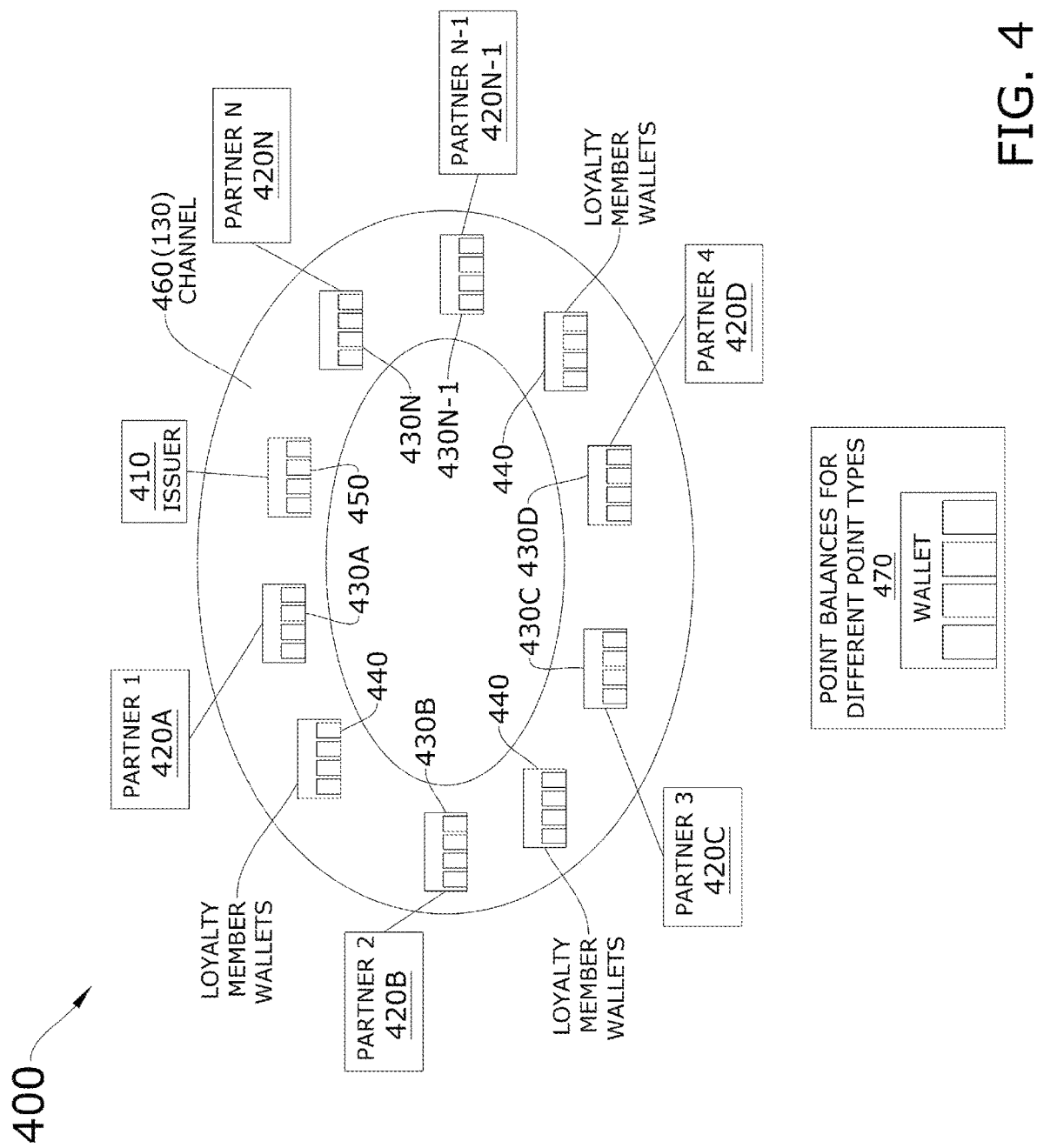

FIG. 4 conceptually illustrates a schematic view of a common transaction channel that holds wallet balances and transactions in some embodiments of the multi-party, multi-point type decentralized loyalty system.

Figure 5:
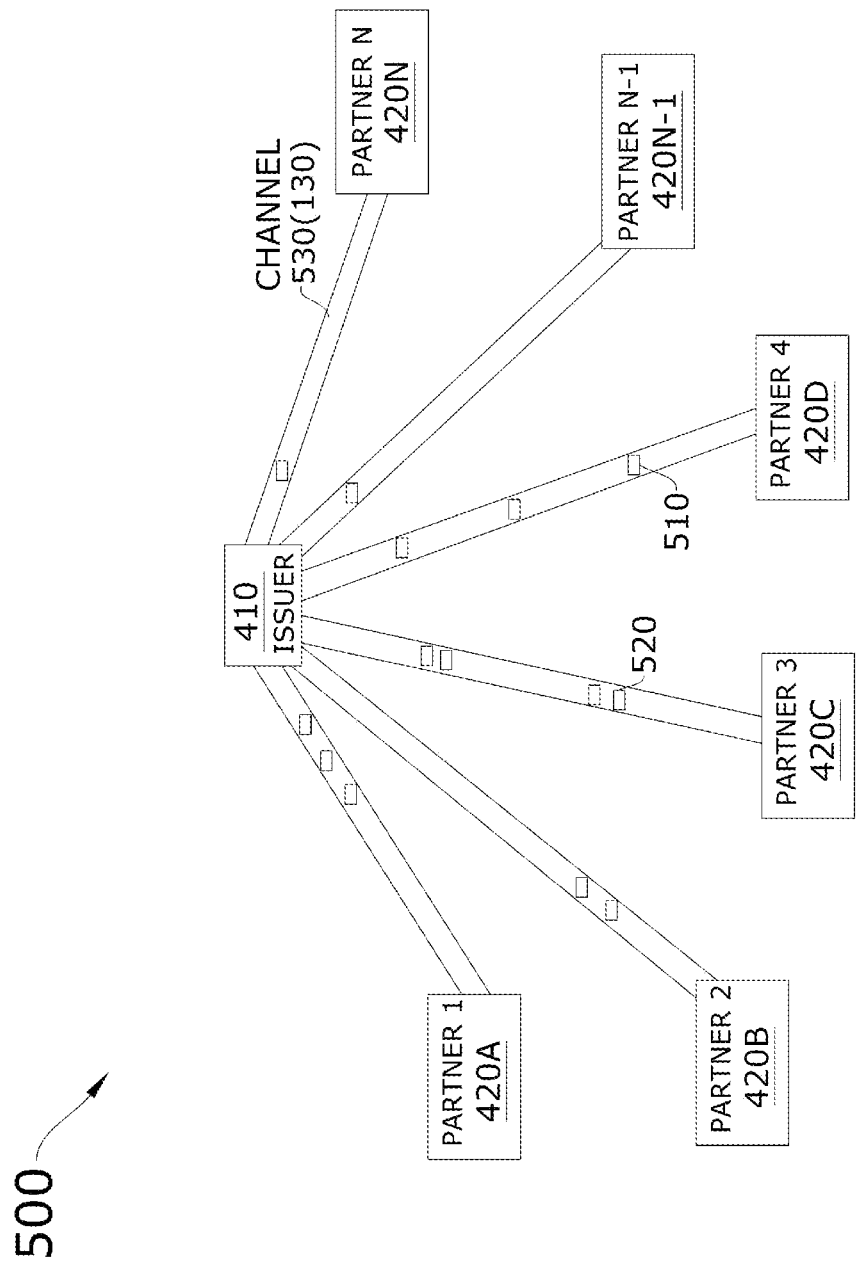

FIG. 5 conceptually illustrates a schematic view of pairwise exchange rate channels between the issuer and partners that hold the exchange rates between point types and exchange rates between point types and fiat currencies in some embodiments of the multi-party, multi-point type decentralized loyalty system.

Figure 6:
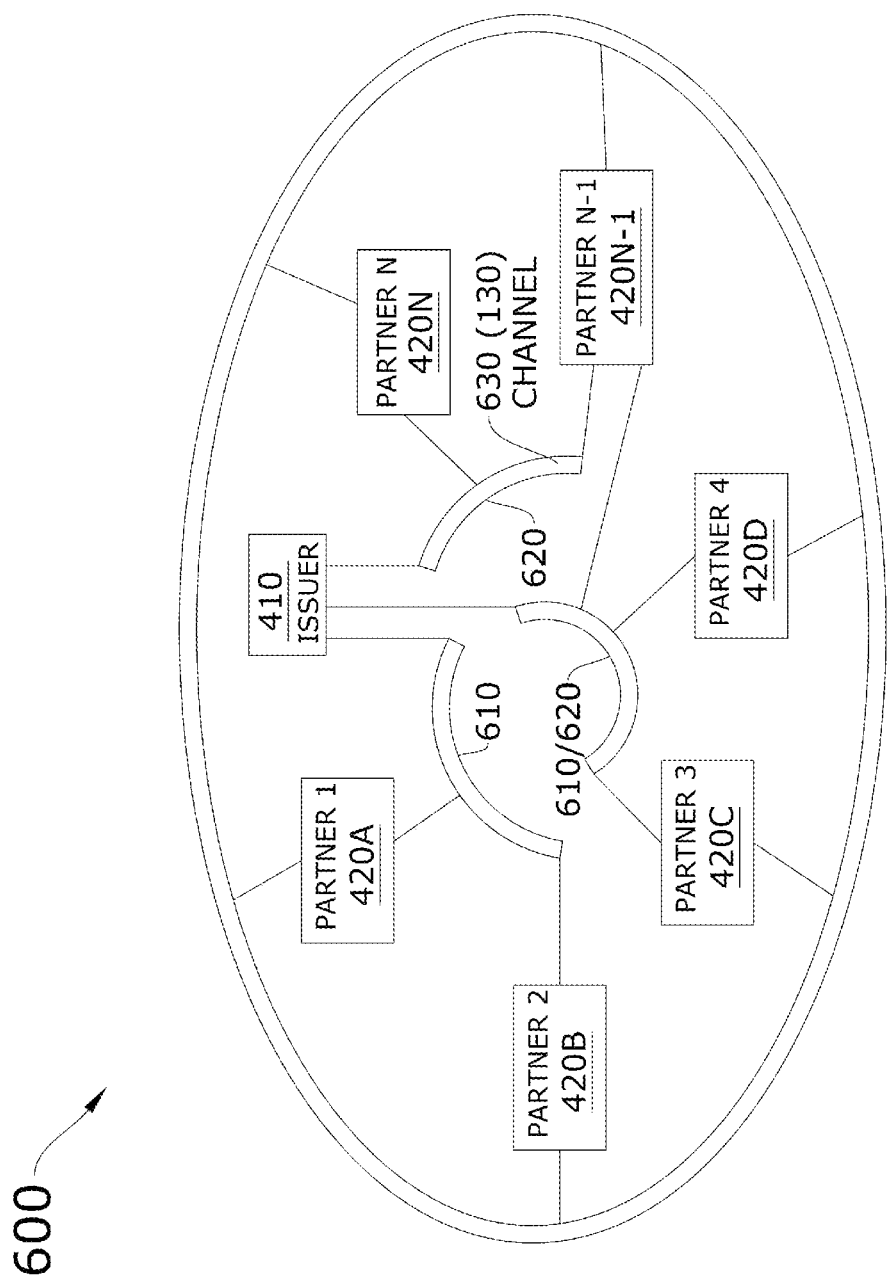

FIG. 6 conceptually illustrates a schematic view of promotion definition channels between issuers and partners in various combinations to hold accrual and redemption promotions in some embodiments of the multi-party, multi-point type decentralized loyalty system.

Figure 7:
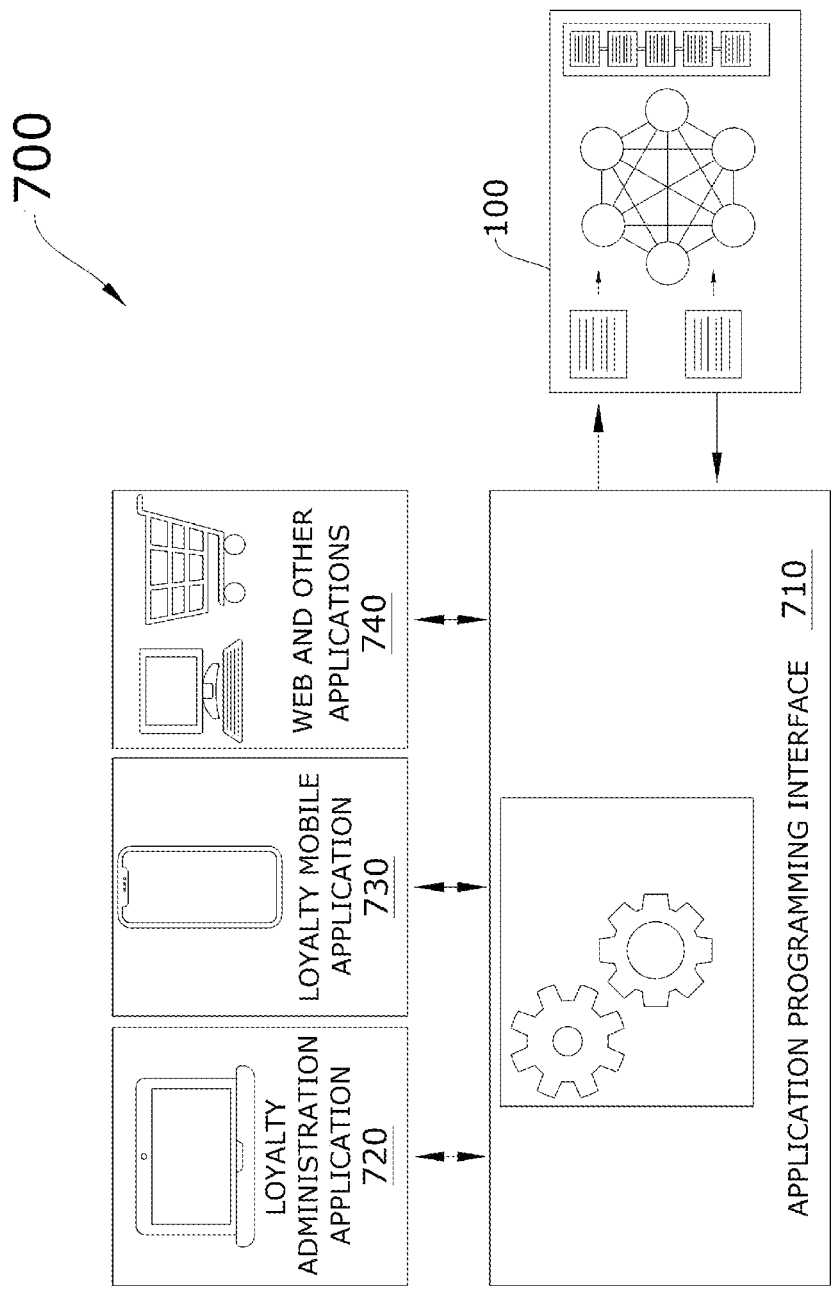

FIG. 7 conceptually illustrates a schematic view of external integrations in some embodiments of the multi-party, multi-point type decentralized loyalty system.

Figure 8:
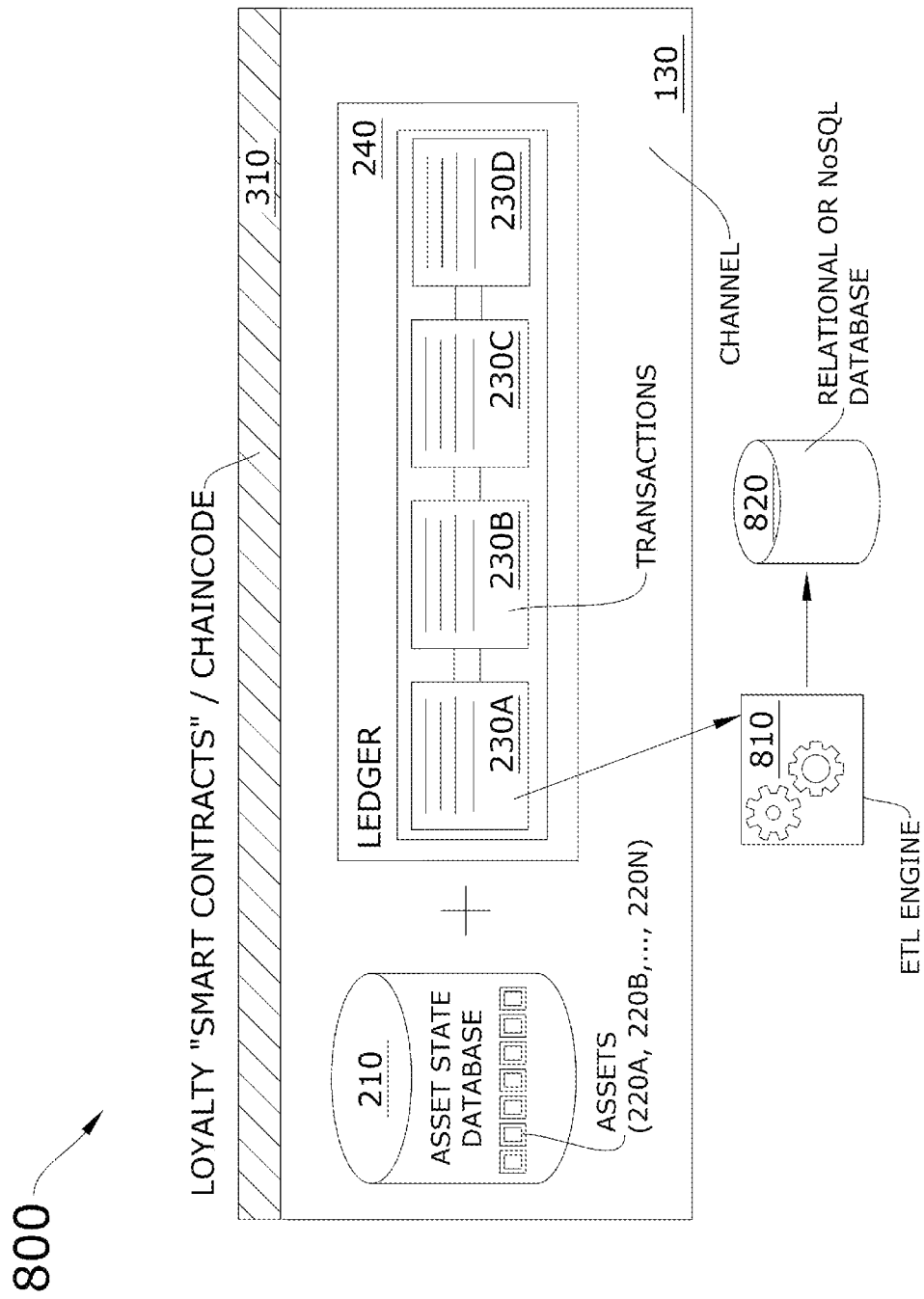

FIG. 8 conceptually illustrates a schematic view of a transaction Extract-Translate-Load (ETL) engine in some embodiments of the multi-party, multi-point type decentralized loyalty system.

Figure 9:
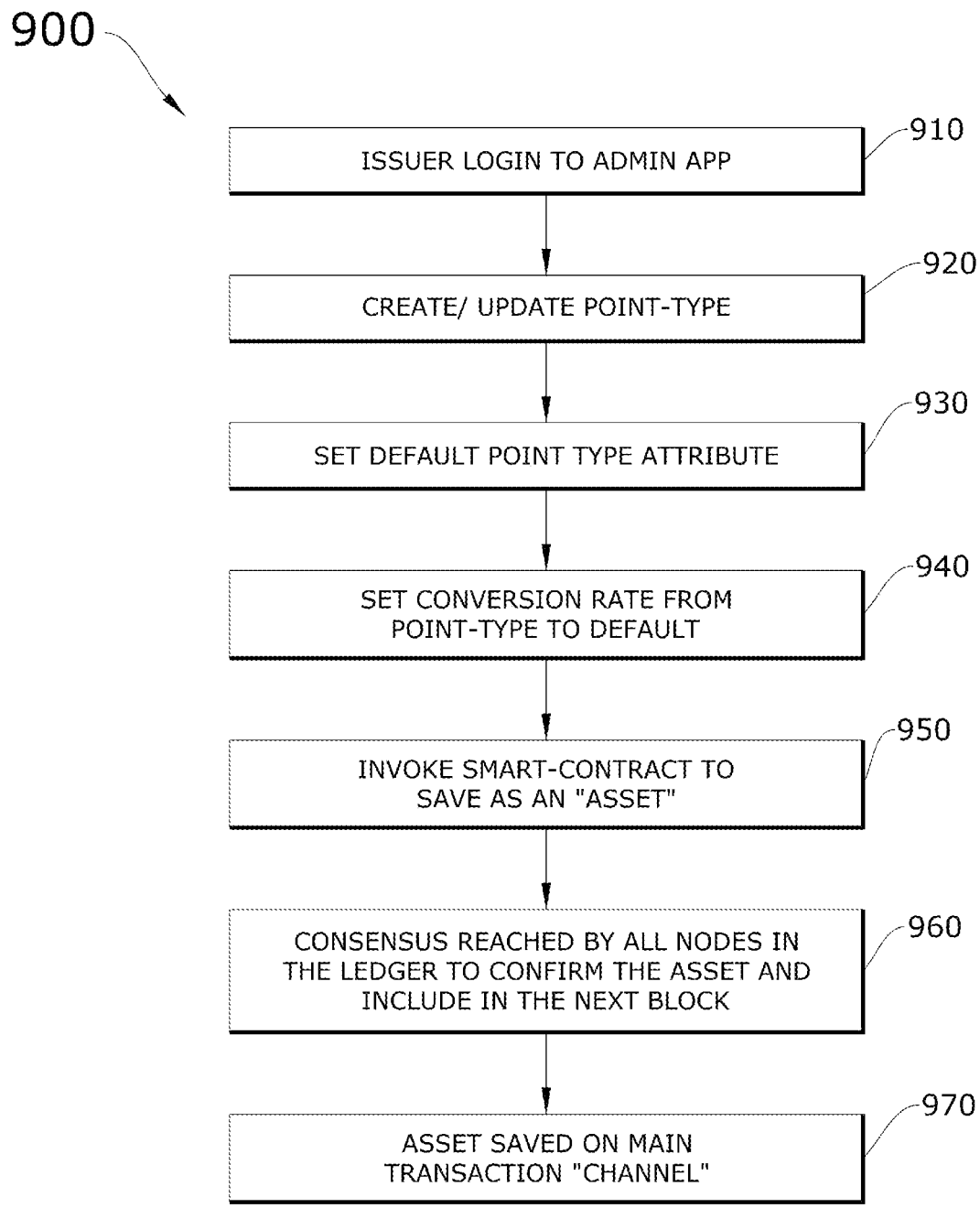

FIG. 9 conceptually illustrates a point-type process for creating and updating point type assets of the multi-party, multi-point type decentralized loyalty system in some embodiments.

Figure 10:
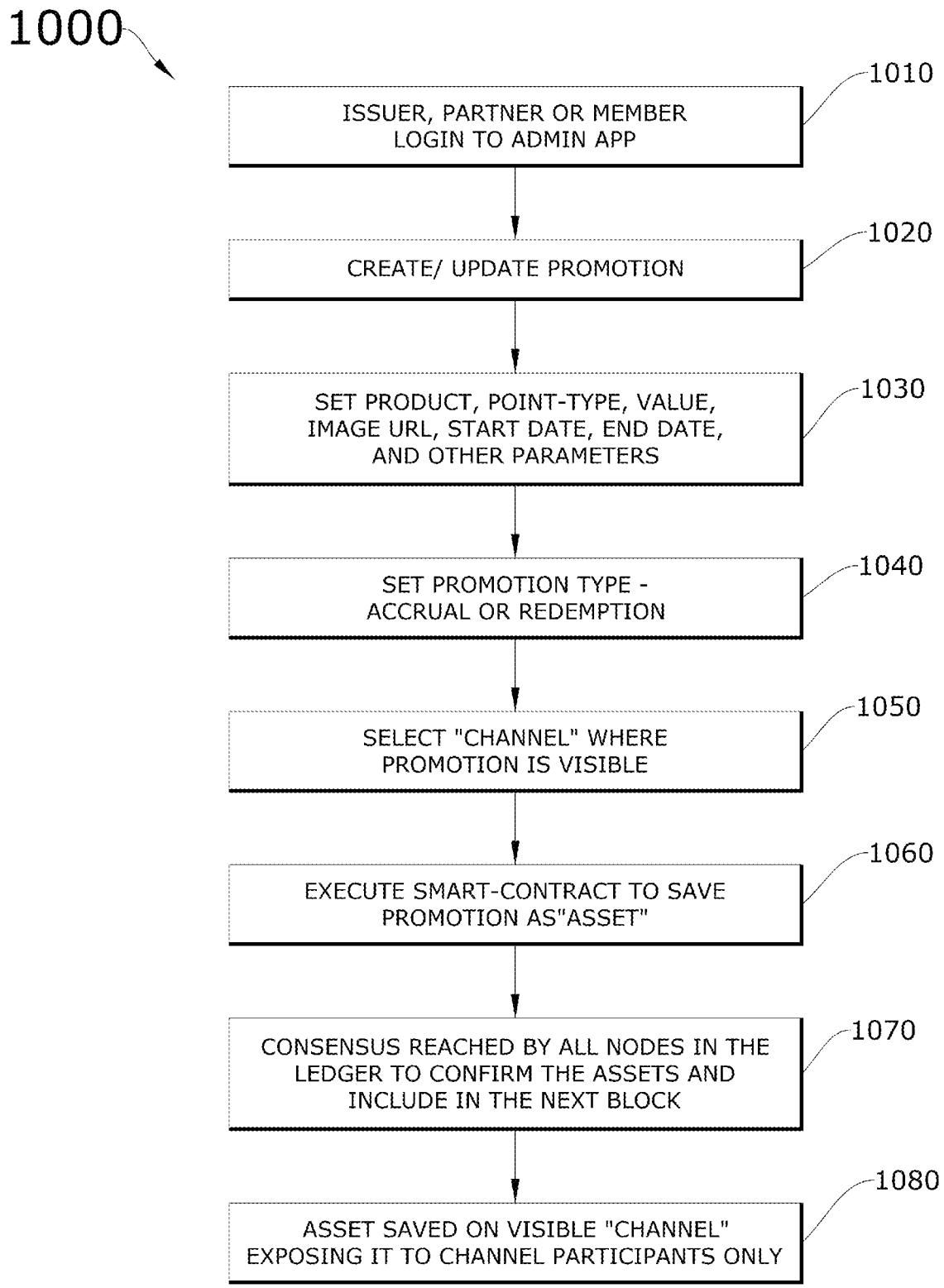

FIG. 10 conceptually illustrates a promotions process for creating and updating promotion assets of the multi-party, multi-point type decentralized loyalty system in some embodiments.

Figure 11:
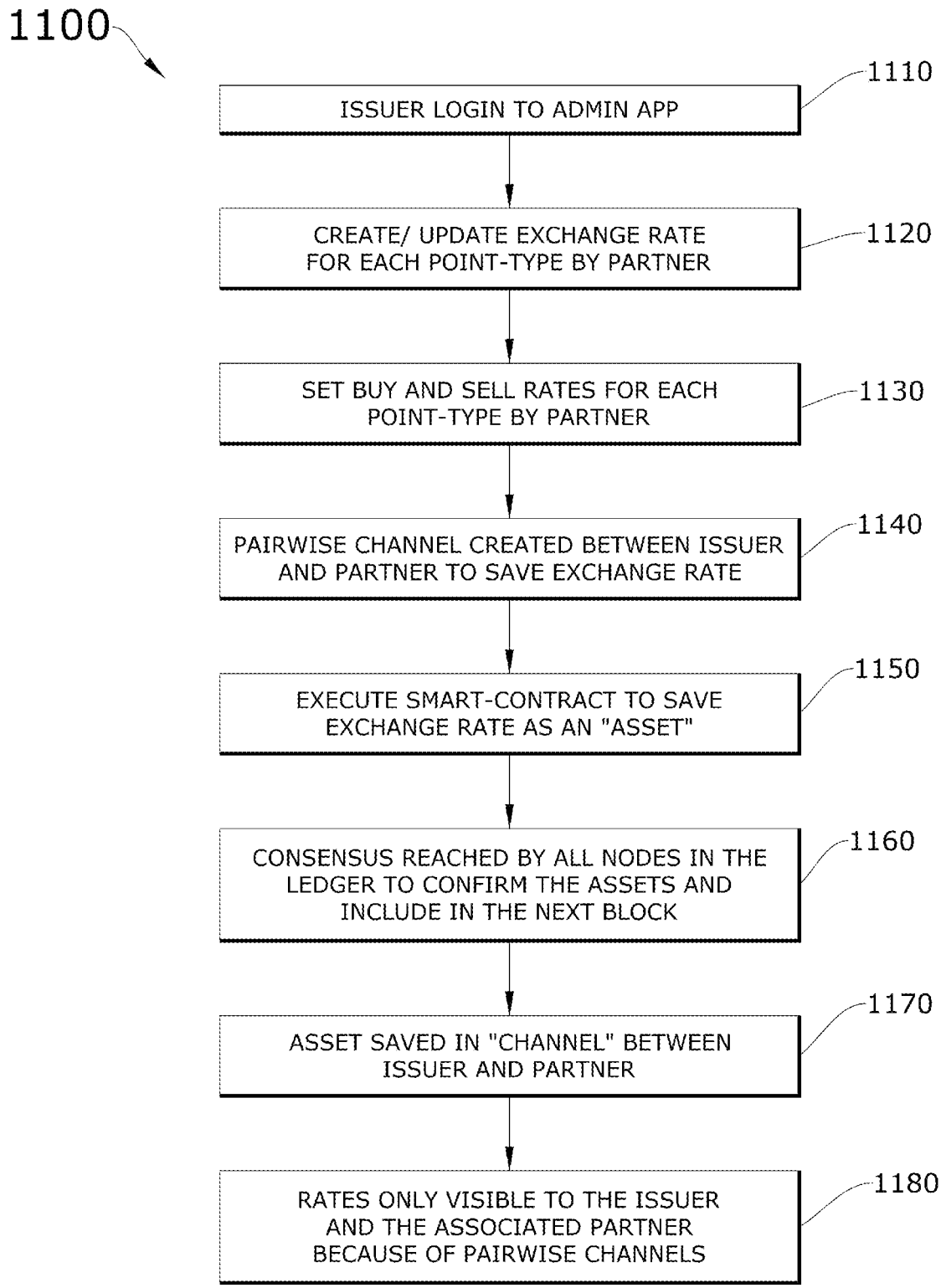

FIG. 11 conceptually illustrates a partner exchange rate process for creating and updating partner exchange rate assets of the multi-party, multi-point type decentralized loyalty system in some embodiments.

Figure 12:
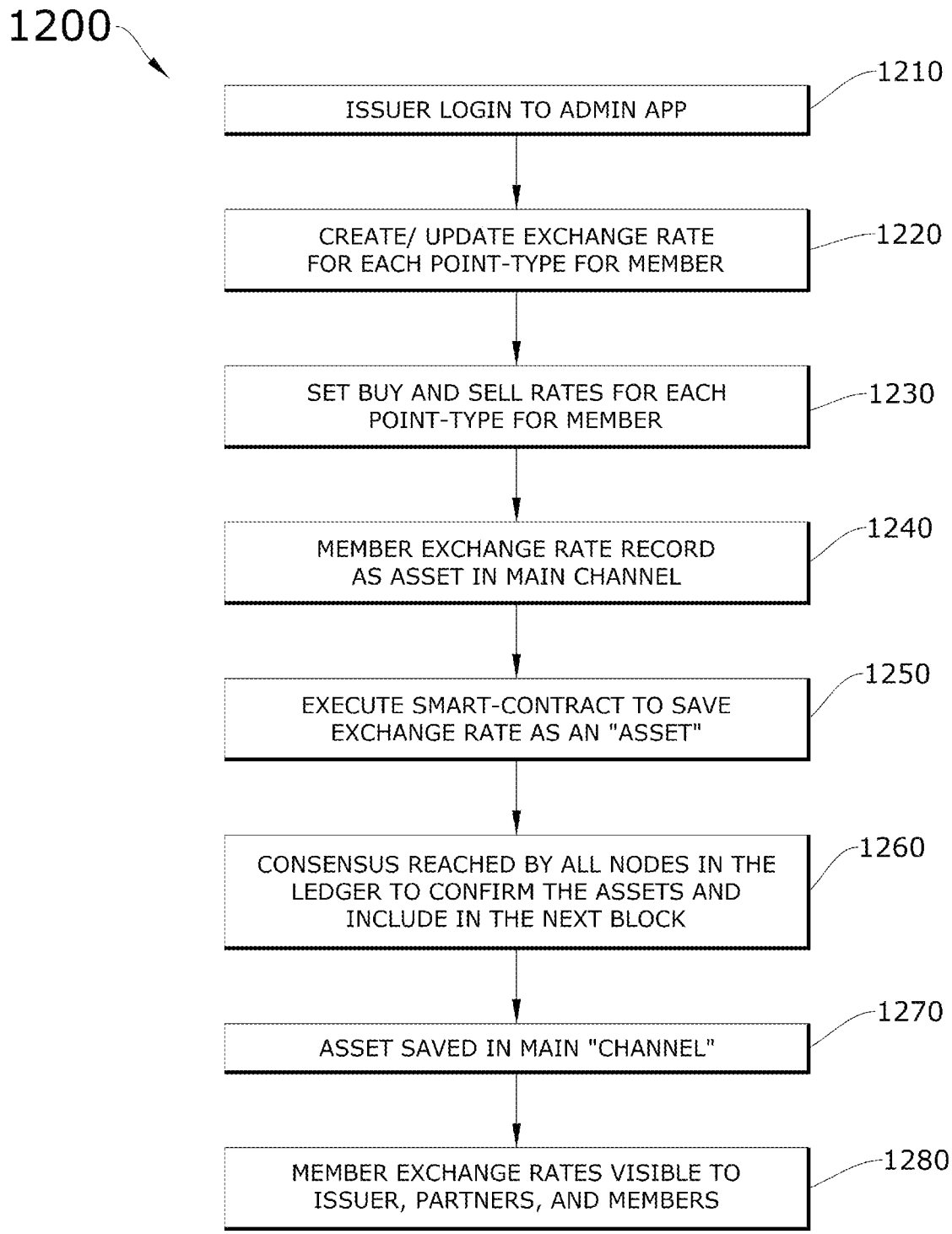

FIG. 12 conceptually illustrates a member exchange rate process for creating and updating member exchange rate assets of the multi-party, multi-point type decentralized loyalty system in some embodiments.

Figure 13:
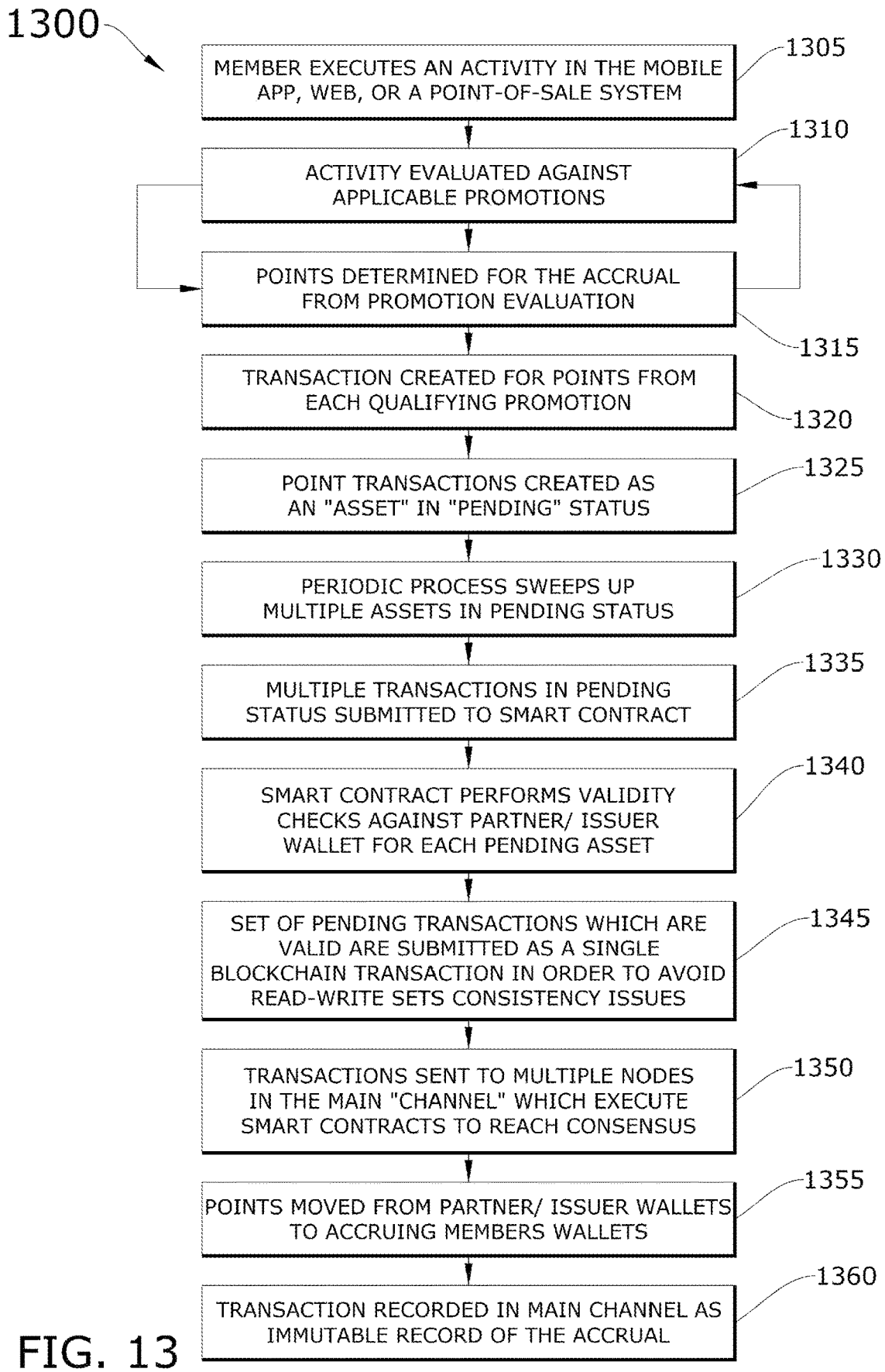

FIG. 13 conceptually illustrates a member accrual process for high throughput of point accrual transactions in some embodiments of the multi-party, multi-point type decentralized loyalty system.

Figure 14:
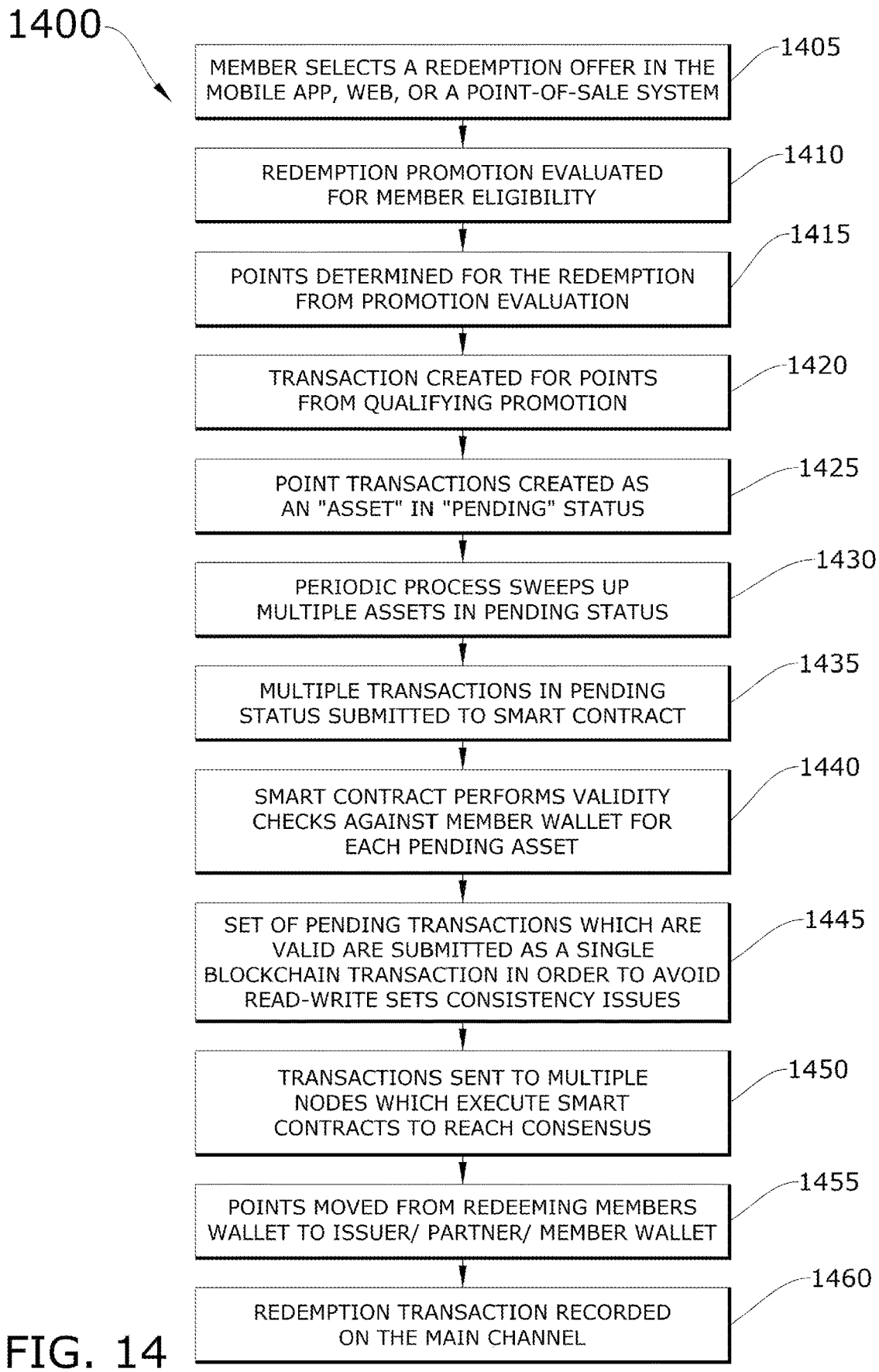

FIG. 14 conceptually illustrates a member redemption process for high throughput of point redemption transactions in some embodiments of the multi-party, multi-point type decentralized loyalty system.

Figure 15:
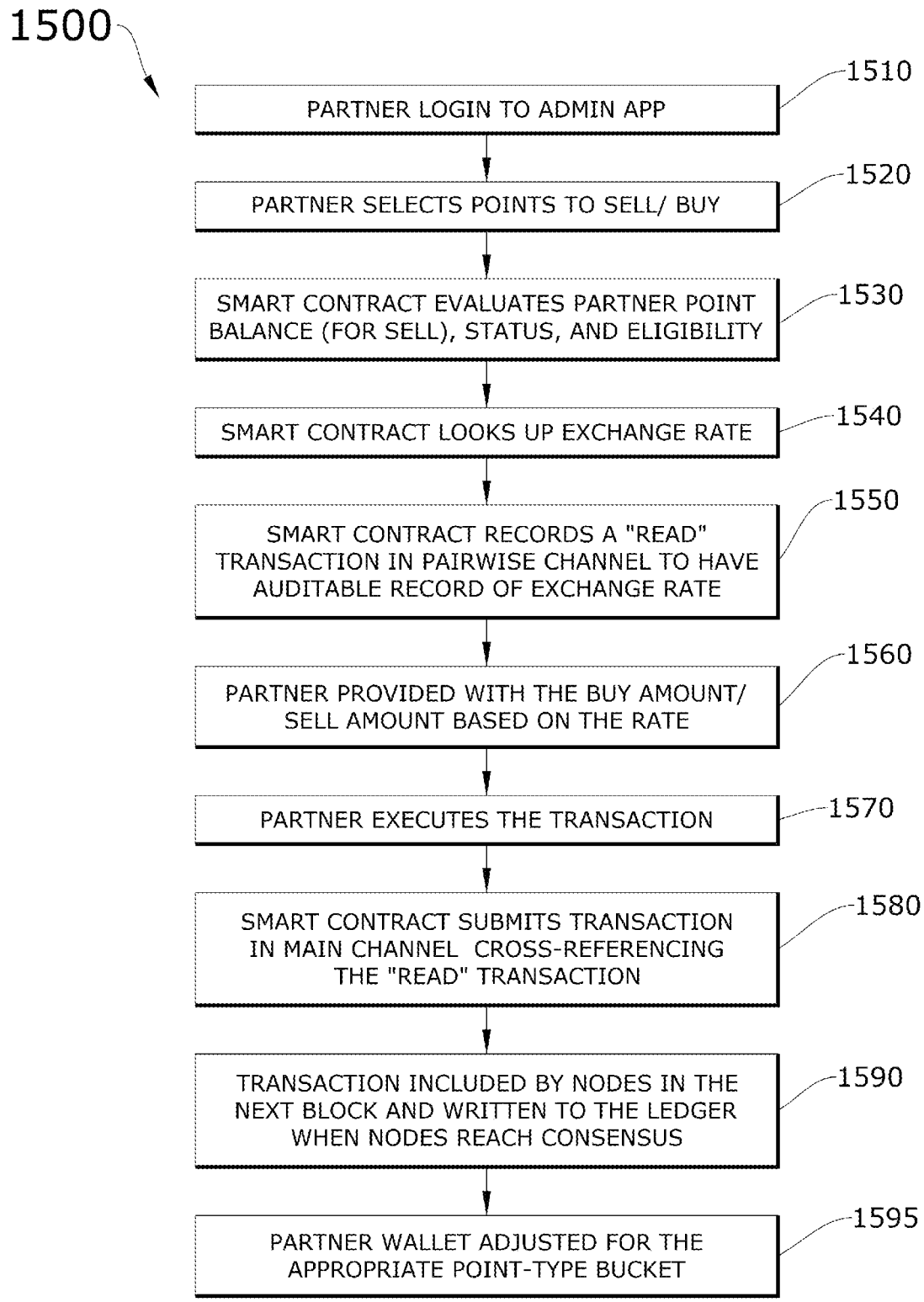

FIG. 15 conceptually illustrates a partner points process for buying and selling points by a partner in some embodiments of the multi-party, multi-point type decentralized loyalty system.

Figure 16:
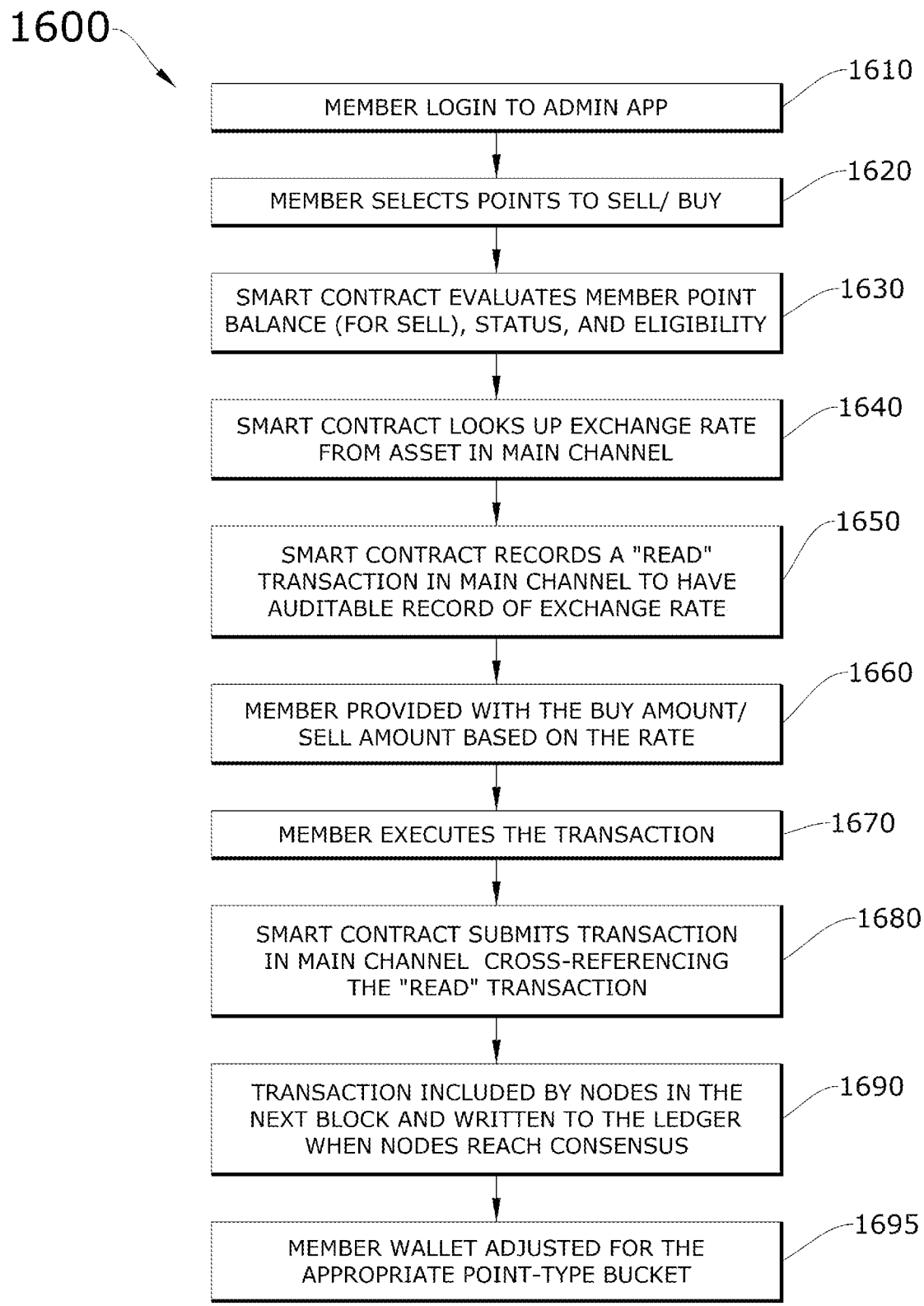

FIG. 16 conceptually illustrates a member points process for buying and selling points by a member in some embodiments of the multi-party, multi-point type decentralized loyalty system.

Figure 17:
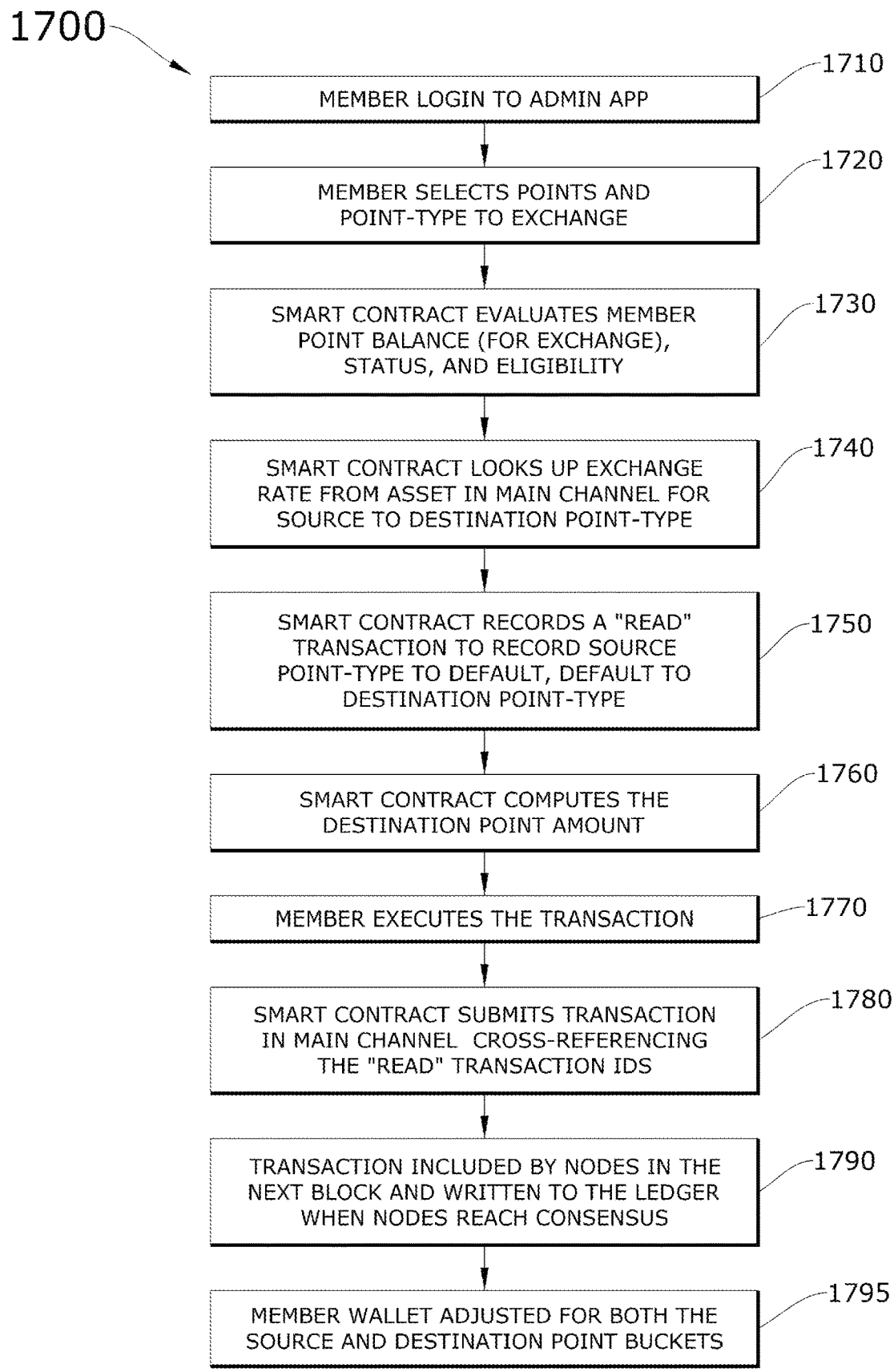

FIG. 17 conceptually illustrates a point-type exchange process for members to exchange from one point-type to another point-type in some embodiments of the multi-party, multi-point type decentralized loyalty system.

Figure 18:
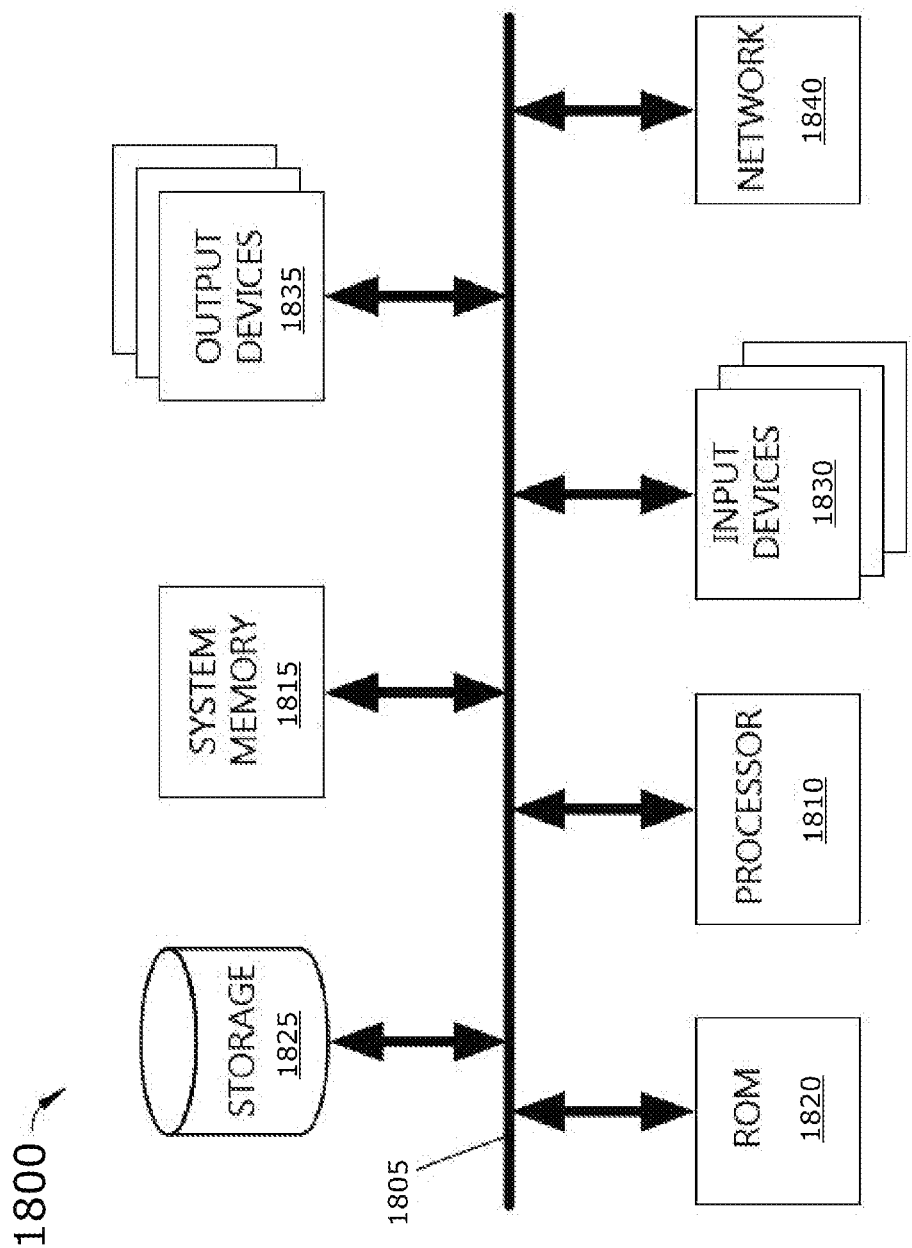

FIG. 18 conceptually illustrates an electronic system with which some embodiments of the invention are implemented.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide a multi-party, multi-point type decentralized loyalty system and associated processes for promotion and point issuance using a permission-based distributed ledger. In some embodiments, the multi-party, multi-point type decentralized loyalty system for promotion and point issuance using a permission-based distributed ledger comprises a permission-based distributed ledger, channels, smart contracts (or chain code), state database and transaction ledger, assets, an API as well as administration tool for partners and issuer, with support for mobile apps and web applications for members.

As stated above, when the issuer of loyalty tokens wants to invite a set of partners to participate in the issue and redemption of loyalty points, the burden falls on the issuer to run a centralized system to manage the loyalty program. The partners are unable to control the rules of the system collectively and do not have real-time access to consumer behavior data. Embodiments of the multi-party, multi-point type decentralized loyalty system described in this specification solve such problems by using a permission-based distributed ledger along with associated "smart contracts". In this way, a loyalty system can be defined such that issuer and partners can collectively define the rules of point accruals and redemptions as well as get access to a copy of immutable ledgers that store both the rules as well as accrual and redemption transactions. Thus, the coalition of issuer and partners get to control the rules of the game as well as get access to consumer accrual and redemption actions in real-time.

The embodiments described in this specification differ from and improve upon currently existing options. In particular, some embodiments differ because today, loyalty software applications allow a centralized party to define and execute the rules for distributing and redeeming points; the same centralized systems tracks the point balances of loyalty members. When partners join as coalition members, they will have to supply the raw transactions to the centralized system (issuer) for processing accruals and redemptions. This results in expensive point to point integration costs for both the issuer and partner. Issuers cannot expand the partner ecosystem easily. Partners do not get an ability to define their own promotions for accrual and redemption and neither do they get access to the real-time consumer behavior data when consumers accrue or redeem their points. This decentralized loyalty software solves all these problems namely (a) issuer can add partners quickly and easily to the system, (b) partners get to define their own promotions for accruals and redemption of their points, (c) by running a "node", partners get a copy of the ledgers used in the system and thus have instantaneous access to consumer behavior data, and (d) since a decentralized ledger is used, all parties will have to agree to any basic change in the rules of the application, thus the coalition is assured of fairness since no change can be made without the agreement of all parties.

In addition, these embodiments improve upon the currently existing options because centralized loyalty systems are cumbersome to maintain and difficult to expand to a set of partners. The decentralized loyalty systems so far in the market do not address the issue of both the issuer and partners gaining transparency of the rules of the system. Instead, they focus on the cryptocurrency minting of loyalty points which is not really useful in a loyalty setting as explained above. By contrast, the multi-party, multi-point type decentralized loyalty system for promotion and point issuance using a permission-based distributed ledger of the present specification allows an issuer and a set of partners gain transparent access to (a) the rules of the system in the form of promotions and exchange rates defined in a distributed ledger and to (b) consumer accrual and redemption transactions posted to the distributed ledger. This allows the complete coalition to operate in a decentralized fashion, with quick on-boarding of new partners and transparent reconciliation of point balances between partner and issuer.

The multi-party, multi-point type decentralized loyalty system for promotion and point issuance using a permission-based distributed ledger of the present disclosure may be comprised of the following elements. This list of possible constituent elements is intended to be exemplary only and it is not intended that this list be used to limit the multi-party, multi-point type decentralized loyalty system for promotion and point issuance using a permission-based distributed ledger of the present application to just these elements. Persons having ordinary skill in the art relevant to the present disclosure may understand there to be equivalent elements that may be substituted within the present disclosure without changing the essential function or operation of the multi-party, multi-point type decentralized loyalty system for promotion and point issuance using a permission-based distributed ledger.

1. A permission-based distributed ledger protocol implemented in software with a set of nodes (computers) to endorse loyalty transactions. An example of a permission-based distributed ledger protocol implemented in software with a set of nodes (computers) to endorse loyalty transactions is described further below, by reference to FIG. 1.
2. Software for implementing "Channels". Channels allow a set of permission-based nodes to have a common immutable distributed ledger where they can write transactions. A high-level example of a channel is described below, by reference to FIG. 1. Furthermore, a more detailed understanding of a channel is that it includes a state database and a record of all transactions stored in an immutable ledger. A detailed example of a channel is described below, by reference to FIG. 2.
3. Software for implementing "Smart Contracts" or "Chain code" (also "chaincode"). Chain code allows for the specification of the rules by which a loyalty related asset can be modified and the nodes participating in the channel endorse and approve the transactions. An example of chaincode of implemented smart contracts for a channel is described below, by reference to FIG. 3.
4. As noted above, a channel includes a state database and a record of all transactions. The state database stores the state of an asset. The record of all transactions are stored as blocks of transactions that are cryptographically linked to each other to form a blockchain. Thus, a channel includes a state database and a blockchain stored in computer storage. Furthermore, the blockchain supports multiple types of channels. The multiple types of channels include at least a main (or "common") channel that holds wallet balances and transactions, a pairwise set of (multiple) channels between the issuer and partners that hold the exchange rates between point types and exchange rates between point types and fiat currencies, and a set of channels between issuers and partners in various combinations to hold accrual and redemption promotions. Detailed examples of the types of channels are described further below, by reference to FIGS. 4-6.
5. Various types of assets, such as accounts, wallets (point balances of different point types), promotions and exchange rates will have smart contracts associated with them by which the assets can be modified, and all modifications stored as immutable transactions on the blockchain. Assets are stored in an asset database, examples of which is described below, by reference to FIGS. 2 and 3.
6. An application programming interface (API) implemented in software that allows for external software programs to access the smart contracts. The API is provided as a layer of the multi-party, multi-point type decentralized loyalty system to allow loyalty applications access. A description of the API is provided below, by reference to FIG. 7.
7. External applications such as (a) computer program to allow for creation and maintenance of accounts, promotions, exchange rates, point types, wallets and other related objects needed to implement a loyalty program, (b) a mobile application that a loyalty member can use to accrue/redeem points as well as look at balances and transactions on one or more point types, (c) integration with other computer systems, such as e-commerce and point of sale (POS) systems. All these computer applications interact with the API to access smart contracts. Examples of external applications are described further below, by reference to FIG. 7.
8. A blockchain transaction extract-translate-load (ETL) engine and associated database (e.g., a relational database). The blockchain transaction ETL engine provides a fast and reliable way to for loyalty applications (both external applications and applications/modules that are embedded in the multi-party, multi-point type decentralized loyalty system to search and analyze transaction blocks of encrypted data in stored on the blockchain.

The various elements of the multi-party, multi-point type decentralized loyalty system for promotion and point issuance using a permission-based distributed ledger of the present disclosure may be related in the following exemplary fashion. It is not intended to limit the scope or nature of the relationships between the various elements and the following examples are presented as illustrative examples only. Software can be implemented on a permission-based distributed ledger (or "blockchain") such as the open-source Hyperledger Fabric software from the Linux consortium, or any similar permission-based blockchain software. A set of computer nodes each of them running the blockchain software form the blockchain consortium. In this applications context, they will be the issuer organization along with a set of partner organizations. The issuer is the issuer of the loyalty point or points, and the issuer acts as the company responsible for taking on the legal liability for all outstanding points in the network.

The blockchain supports multiple channels, including (a) the main (common) channel that holds wallet balances and transactions, (b) a pairwise set of channels between the issuer and partners that hold the exchange rates between point types and exchange rates between point types and fiat currencies, and (c) a set of channels between issuers and partners in various combinations to hold accrual and redemption promotions. Nodes of the blockchain will participate in these channels. Each channel will have smart contracts (or "chain code") that is implemented in software and that specify how the objects associated with a loyalty system such as accounts, point types, balances, promotions and exchange rates can be defined and modified. In order to facilitate this, each channel will include a state database that holds the current state of an asset (such as the current point balance for a member) along with a set of immutable transactions stored in a chain of blocks on computer storage. The current state of any asset can be established by going through the list of transactions that created and modified the asset.

In order for the assets to be modified by external software entities, an API is implemented in software. The API layer provides functions that can be called by an external software application by presenting the correct cryptographic credentials. The cryptographic credentials are verified by the smart contracts to ensure that calls to the API layer are properly permissioned.

Lastly, in order for the multi-party, multi-point type decentralized loyalty system for promotion and point issuance using a permission-based distributed ledger to be functional, at least two types of external software programs are needed which will access the API layer in order to implement a loyalty program. An administrative tool which allows for creation and maintenance of accounts, promotions, exchange rates, point types, wallets and other related objects needed to implement a loyalty program and a web or mobile application that a loyalty member can use to accrue/redeem points as well as look at balances and transactions on one or more point types. Additional computer systems such as point of sale and e-commerce systems can optionally access the loyalty functions through the API layer.

The multi-party, multi-point type decentralized loyalty system for promotion and point issuance using a permission-based distributed ledger of the present disclosure generally works by democratizing loyalty applications by allowing a set of partners to administer a loyalty program in addition to the issuer. In some embodiments, each partner can define their own rules of accrual and redemption as well as negotiate loyalty point exchange rates with the issuer. All this information and any modifications to the information is securely stored in a distributed ledger as well as shared among the issuer and partner. In some embodiments, the issuer, the member, and the partners all have wallets in the multi-party, multi-point type decentralized loyalty system for promotion and point issuance using a permission-based distributed ledger to maintain their point balances and are able to exchange points between each other without the problem of double spend. This is because each transaction is approved by a set of nodes run by the issuer and partners, thus eliminating the need for trust in a single centralized system. The multi-party, multi-point type decentralized loyalty system for promotion and point issuance using a permission-based distributed ledger is designed in such a way that even a member can offer their services (a "promotion" in loyalty parlance) for a price in points that they can set. This type of democratization of loyalty between the issuer, the partner, and the member is a key aspect and feature that differentiates multi-party, multi-point type decentralized loyalty system for promotion and point issuance using a permission-based distributed ledger from existing loyalty applications.

While some modern loyalty applications have used the distributed ledger to generate tokens via mining, etc., the multi-party, multi-point type decentralized loyalty system for promotion and point issuance using a permission-based distributed ledger of the present specification does not require or involve any such mining activity. In some embodiments of the multi-party, multi-point type decentralized loyalty system for promotion and point issuance using a permission-based distributed ledger, the creation of tokens and the backing of tokens with reserve is done by the issuer just like in traditional loyalty systems. What is unique is the administration and execution of promotions and exchange rates, which the multi-party, multi-point type decentralized loyalty system for promotion and point issuance using a permission-based distributed ledger allows to be completed by both the issuer and partner (and in some cases by a member too) using a shared distributed ledger to maintain these entities.

In some embodiments, the key pieces of logic include the "smart contracts" implemented in software that specify the rules by which points are transferred, exchange rates are defined, and promotions are defined. By defining these entities in a distributed ledger, the multi-party, multi-point type decentralized loyalty system for promotion and point issuance using a permission-based distributed ledger allows for a set of partner organizations to participate in the network as equal partners because the smart contracts cannot be changed without the consent of all partners who run a node. At the same time, each partner is free to define the promotions that they wish put in place for both accrual and redemption of loyalty points. Lastly, the multi-party, multi-point type decentralized loyalty system for promotion and point issuance using a permission-based distributed ledger of some embodiments allows the creation of multiple loyalty point types as well as the rules of exchange between the point types. This is achieved through implementation of smart contracts in the multi-party, multi-point type decentralized loyalty system for promotion and point issuance using a permission-based distributed ledger.

To make the multi-party, multi-point type decentralized loyalty system for promotion and point issuance using a permission-based distributed ledger of the present disclosure, a person may develop software to implement the seven key elements described above in order to have a useful application. The issuer and partner will use a software program called as the administration tool to implement the rules of the system. A member of the loyalty application can use a web or mobile application to earn and redeem points based on the rules defined by the issuer and partners as well as look at their point balances and transactions.

In some embodiments, the multi-party, multi-point type decentralized loyalty system for promotion and point issuance using a permission-based distributed ledger can be extended to serve new types of applications besides a traditional loyalty program run by an issuer and set of partners. For example, since the promotions are defined and shared in a distributed ledger, the member facing application of the multi-party, multi-point type decentralized loyalty system for promotion and point issuance using a permission-based distributed ledger can be enhanced to allow for a member to enter a promotion to offer goods and services in exchange for points. In this sense, the application for the multi-party, multi-point type decentralized loyalty system for promotion and point issuance using a permission-based distributed ledger can democratize loyalty not only between an issuer and set of partners, but to all participants of the loyalty program including members.

To use the multi-party, multi-point type decentralized loyalty system for promotion and point issuance using a permission-based distributed ledger of the present disclosure, an issuer would use the administration tool to set up accounts for the issuer and set of partners along with "wallets" to store point balances. In addition, the issuer will invite partner administrators to use the admin tool by enabling appropriate authentication and authorization. Both issuers and partners can create accrual and redemption promotions in order to offer goods and services in exchange for points as well as allowing members to accrue points based on member behaviors. These behaviors can be both monetary (such as purchase of a product) as well as non-monetary (such as making a positive comment in social media about a company or its products). The exchange rates and promotions are stored in the ledger and shared between Issuer and Partners. No unauthorized modifications are possible since every change is recorded immutably and agreed upon between all the computer nodes based on predefined smart contracts. Members will enroll in the program through a web or mobile software application, which results in the creation of accounts and wallets for the member. Members will transact using the mobile and web application and will accrue or redeem points. Point exchanges will be saved as immutable transactions of the ledger and the transactions themselves approved by the nodes so that the problem of double spend of points is solved. A modified version of the multi-party, multi-point type decentralized loyalty system for promotion and point issuance using a permission-based distributed ledger (software implemented application) can also be used where members can create promotions to exchange goods and services for points and members can also hold multiple wallets for multiple point types. They could then "convert" between the different point types based on conversion rates negotiated between the different partners.

By way of example, FIG. 1 conceptually illustrates a schematic view of a permissioned distributed ledger protocol 100 in some embodiments of the multi-party, multi-point type decentralized loyalty system with a set of nodes 120 to endorse loyalty transactions. In some embodiments, the permissioned distributed ledger protocol 100 is implemented in software with a set of computing device nodes 120 to endorse loyalty transactions. As shown in this figure, the set of nodes 120 are interconnecting validating nodes, such as node 120A, node 120B, node 120C, node 120D, node 120E, and node 120F. In some embodiments, the set of validating nodes 120 includes more nodes or fewer nodes. The validating nodes 120 are central to validating transactions for the permissioned distributed ledger protocol 100 of the multi-party, multi-point type decentralized loyalty system. Thus, as shown in this figure, the validating nodes 120 receive smart contract defining transactions 110 and smart contract invoking transactions 140. The smart contract defining transactions 110 define a channel 130. The channel 130 allows the set of validating nodes 120 and other permissioned nodes to have a common immutable distributed ledger where they can write transactions. In some embodiments, the validating nodes 120 each store a copy of the ledger for the channel 130, thereby allowing for validation of any transaction over the channel 130. Channels are described in further detail below, by reference to FIGS. 2-6. The smart contract invoking transactions 140 are validated by the validating nodes 120 and immutably written in the ledger of the channel 130.

By way of another example, FIG. 2 conceptually illustrates a schematic view 200 of a channel 130 in some embodiments of the multi-party, multi-point type decentralized loyalty system. In some embodiments, a channel comprises a state database that stores the state of each "asset" and ledger that keeps a record of all transactions in blocks of transactions that are cryptographically linked to each other to form a blockchain. Overall, channels allow a set of permissioned nodes to have a common immutable distributed ledger to which they can write transactions. In some cases, the channel 130 is implemented as software. Also, there are various types of "assets" that can be stored and whose states can be modified according to smart contract rules for that asset. Examples of different types of assets include, without limitation, accounts, wallets (with point balances of different types of points), promotions, and exchange rates. When the associated smart contract for an asset permits modification, then the modified asset would be stored as an immutable transaction on the blockchain. Thus, as shown in this figure, a state database 210 stores the states of assets 220A, 220B, . . . , 220N and a ledger 240 includes a chain of transaction blocks 230A-230D that are cryptographically linked to each other to form the blockchain. The chain of transaction blocks 230A-230D shown in this figure is an example of a chain of transaction blocks only and, thus, the ledger 240, or any other ledger described in this disclosure, is not construed to be limited to cryptographically storing only four transaction blocks, but may include any number of transaction blocks. Also, the state database 210 is shown in this figure storing the states of assets 220A, 220B, . . . , 220N but is not construed to be limited in the number of assets or states that can be stored as a state database for a channel in connection with any of the embodiments of the present disclosure may store the states of any number of assets and any number of states. Thus, the channel 130 includes the state database 210 and the ledger 240 (or rather, the blockchain of transactions blocks stored in computer storage).

Turning to another example, FIG. 3 conceptually illustrates a schematic view 300 of smart contracts (also referred to as "chaincode") for the channel that define loyalty rules that govern asset state changes in the state database in some embodiments of the multi-party, multi-point type decentralized loyalty system. In some embodiments, software for implementing the smart contract/chaincode 310 enables the definition and/or specification of the rules by which a loyalty-related "asset" (such as those noted above by reference to FIG. 2) can be modified or changed, and the validating nodes 120 participating in the channel 130 endorse and approve the transactions as per the defined rules. Specifically, this schematic view 300 demonstrates the chaincode 310 layer connected to the channel 130, with its state database 210 storing the states of assets 220A, 220B, . . . , 220N and the ledger 240 with the chain of transaction blocks 230A-230D cryptographically linked to each other to form the blockchain that provides the common immutable distributed ledger where the set of validating nodes 120 and other permissioned nodes can write transactions. If the state of an asset stored in the state database 210 is changed, the loyalty rules as defined by the smart contract/chaincode 310 for the channel 130 are checked to see if the asset state change is permitted.

While the examples above focus on software implementations of the permissioned distributed ledger protocol, channels, asset state databases, and chaincode on the channel, as well as the record of transaction blocks, or blockchain, the next few examples, described below by reference to FIGS. 4-6, focus on different types of channels. Specifically, a blockchain supports multiple channels, including (a) a main (or "common") channel that holds wallet balances and transactions, described below by reference to FIG. 4, (b) a pairwise set of channels between the issuer and partners that hold the exchange rates between point types and exchange rates between point types and fiat currencies, described below by reference to FIG. 5, and (c) a set of channels between issuers and partners in various combinations to hold accrual and redemption promotions, described below by reference to FIG. 6. In particular, nodes of the blockchain in each case will participate in these channels. Smart contracts (the "loyalty chain code") in each channel type specify how the assets, such as accounts, point types, balances, promotions, and exchange rates, for the loyalty system can be defined and modified. As noted above by reference to FIGS. 2 and 3, each channel has a state database to store the current state of an asset (such as the current point balance for a member) along with a set of immutable transactions stored in a chain of transaction blocks (the "blockchain") on computer storage. As such, the current state (or past state(s)) of any asset can be established by going through the list of transactions that created and modified the asset.

Among the various types of channels, reference is first made to FIG. 4, in which a schematic view 400 of a common transaction channel as holding wallet balances and transactions is conceptually illustrated for the multi-party, multi-point type decentralized loyalty system. In this figure, the type of channel 130 is a common transaction channel 460 which holds point balances 470 of different point types in the wallets of issuers, partners, and loyalty members. Specifically, a point issuer 410 with an issuer wallet 450 of the common transaction channel 460 provides points to a plurality of partners and a plurality of loyalty members. The plurality of partners 420 includes a first partner 420A, a second partner 420B, a third partner 420C, a fourth partner 420D, a penultimate partner 420N-1, and a final partner 420N. The points for partners 420 are saved in a plurality of partner wallets 430 comprising a first partner wallet 430A for the first partner 420A, a second partner wallet 430B for the second partner 420B, a third partner wallet 430C for the third partner 420C, a fourth partner wallet 430D for the fourth partner 420D, . . . , a penultimate partner wallet 430N-1 for the penultimate partner 420N-1, and a final partner wallet 430N for the final partner 420N. The partners 420 variously distribute points to loyalty member wallets 440 associated with loyalty members in the common channel 460. Each type of wallet 430, 440, and 450 is capable of storing point balances for different types of points 470.

Referring now to another type of channel, FIG. 5 conceptually illustrates a schematic view 500 of pairwise exchange rate channels between the issuer and partners that hold the exchange rates between point types and exchange rates between point types and fiat currencies in some embodiments of the multi-party, multi-point type decentralized loyalty system. In this figure, the type of channel 130 is a pairwise exchange rate channel 530 which holds exchange rate type assets, including fiat to point type exchange rates and point to point type exchange rates. Each pairwise exchange rate channel 530 between the issuer 410 and a partner can hold one or more exchange rate assets. By way of example, in one of the pairwise exchange rate channels 530 between the issuer 410 and the fourth partner 420D, a fiat to point type exchange rate 510 may specify that ten points is equivalent to $0.10 in fiat currency, while another pairwise exchange rate channel 530 between the issuer 410 and the third partner 420C may hold an exchange rate asset the defines a point type to point type exchange rate 520, such as ten points (of point type "A") is equivalent to a hundred tokens (of point type "B").

Now turning to another type of channel, FIG. 6 conceptually illustrates a schematic view 600 of promotion definition channels between issuers and partners in various combinations to hold accrual and redemption promotions in some embodiments of the multi-party, multi-point type decentralized loyalty system. In this figure, the type of channel 130 is a promotion definition channel 630 which holds promotion type assets, including accrual and redemption promotion definitions. Each promotion definition channel 630 is between the issuer 410 and one or more partners. Specifically, one of the promotion definition channels 630 between the issuer 410 and the first and second partners 420A and 420B, respectively, defines a point accrual promotion 610, while another promotion definition channel 630 between the issuer 410 and the penultimate and final partners 420N-1 and 420N, respectively, defines a point redemption promotion 620. A promotion definition channel 630 can define and hold multiple promotion type assets, and any particular partner may be combined with other partners in multiple promotion definition channels 630. This is shown in a third exemplary promotion definition channel 630 between the issuer 410 and the combination of the third partner 420C, the fourth partner 420D, and the penultimate partner 420N-1, with both a point accrual promotion 610 and a point redemption promotion 620 being defined in the promotion definition channel 630.

By way of example, FIG. 7 conceptually illustrates a schematic view 700 of external integrations in some embodiments of the multi-party, multi-point type decentralized loyalty system. As shown in this figure, an application programming interface (API) 710, as implemented in software, allows for external software programs to access the smart contracts via the permissioned distributed ledger protocol 100. Some of the software integrations shown in this figure include a loyalty administration application 720, a loyalty mobile application 730, and web and other applications 740. The loyalty administration application 720 provides an administrative interface for creation and maintenance of accounts, promotions, exchange rates, point types, wallets, and other related objects that may be defined as needed for any particular loyalty program. The loyalty mobile application 730 provides a user interface which a loyalty member can use to accrue points, redeem points, review point balances, review transactions (history of prior transactions), and perform other loyalty member operations. The loyalty mobile application 730 provides the user interface for the loyalty members to do those actions and operations for one point type or for multiple different point types. The web and other applications 740 provide integrations to other computer systems, such as e-commerce systems, point-of-sale (POS) systems, etc., as well as different user interface implementations, such as a web application with web interface for users to perform loyalty member operations and actions. The loyalty administration application 720, the loyalty mobile application 730, and the web and other applications 740 all interact with the API 710 to access the smart contracts specified in connection with the permissioned distributed ledger protocol 100.

Referring to another example, FIG. 8 conceptually illustrates a schematic view 800 of a blockchain transaction extract-translate-load (ETL) engine 810 in some embodiments of the multi-party, multi-point type decentralized loyalty system. As shown in this figure, the blockchain transaction ETL engine 810 is communicably connected to a database 820, such as a relational database, a NoSQL database, or another type of database. Functionally, blockchain transactions are stored in a format that ensures their immutability and tamper-proof nature. While these provide a high level of confidence in the immutable transactions, it turns out that it is not easy to search or perform analysis of the transactions and associated data. Yet loyalty applications need access to this data. To provide this access, the blockchain transaction ETL engine 810 listens to every block on the blockchain that has reached finality, and extracts the data into a convenient and easy to search/analyze database 820, such as a relational database and relational database management system (e.g., Oracle, SQL Server, Postgres, MySQL, etc.), or a NoSQL database, such as Couchdb, Mongodb, or Berkeleydb. Thus, in this figure, the blockchain transaction ETL engine 810 is able to extract, translate, and load the data from the first transaction block 230A in the chain of transactions stored in the ledger 240 for the channel 130.

While the examples described above, by reference to FIGS. 1-8, provide conceptual details of the multi-party, multi-point type decentralized loyalty system for promotion and point issuance and its use of a permissioned distributed ledger for promotion, point issuance, and point redemption connected with one or more loyalty programs, the next several examples provide details of processes performed by and in connection with the multi-party, multi-point type decentralized loyalty system. Specifically, the processes described by reference to FIGS. 9-12, demonstrate the creation and updating of key assets that form the central (master) data in the multi-party, multi-point type decentralized loyalty system, while the processes described by reference to FIGS. 13-17 demonstrate loyalty member and partner use of applications/integrations that access and allow interaction with the multi-party, multi-point type decentralized loyalty system.

By way of example, FIG. 9 conceptually illustrates a point-type process for creating and updating point type assets 900 of the multi-party, multi-point type decentralized loyalty system in some embodiments. As shown in this figure, the point-type process for creating and updating point type assets 900 starts when an issuer logs into the admin app (at 910). For example, the issuer starts a software program with the loyalty administration application 720, described above by reference to FIG. 7, which provides an administrative interface for creation and maintenance of accounts, promotions, exchange rates, point types, wallets, and other related objects that may be defined as needed for any particular loyalty program. In this example, a point-type is created or updated by the issuer, as described next.

In some embodiments, the point-type process for creating and updating point type assets 900 moves to the next step at which the issuer creates or updates a point-type (at 920). For example, the issuer intends to create a new point-type for a new loyalty program, or the issuer simply wants to update an existing, previously defined point-type. In some embodiments, the point-type process for creating and updating point type assets 900 moves forward to set a default point type attribute (at 930), followed by setting a conversion rate from the point-type to default (at 940).

In some embodiments, the point-type process for creating and updating point type assets 900 then invokes a smart contract to save the new (or updated) point-type as an asset (at 950). For example, the new point-type is saved in the asset state database 210. After invoking the smart contract to save the point-type as an asset, the point-type process for creating and updating point type assets 900 of some embodiments continues to the next step at which a consensus is reached by all of the validating nodes in connection with the ledger to confirm the asset and include details and data for the asset in the next transaction block in the ledger (at 960).

Next, the point-type process for creating and updating point type assets 900 of some embodiments proceeds to save the asset on the main transaction channel (at 970). For example, saving the asset as a point-type asset on the main channel, such as the common channel that holds holding wallet balances and transactions described above by reference to FIG. 4. After saving the asset on the main (or common) channel, the point-type process for creating and updating point type assets 900 ends.

Next, turning to another example, FIG. 10 conceptually illustrates a promotions process for creating and updating promotion assets 1000 of the multi-party, multi-point type decentralized loyalty system in some embodiments. As shown in this figure, the promotions process for creating and updating promotion assets 1000 with an issuer, a partner, or a loyalty member (referred to in the description of FIG. 10 as the "user") logging into the admin app (at 1010), such as the loyalty administration application 720, described above by reference to FIG. 7, which provides an administrative interface for creation and maintenance of accounts, promotions, exchange rates, point types, wallets, and other related objects that may be defined as needed for any particular loyalty program. In this example, a promotion is created or updated by the user, as described next.

In some embodiments, the promotions process for creating and updating promotion assets 1000 creates or updates a promotion (at 1020), as directed by the user through the admin app. In some embodiments, the promotions process for creating and updating promotion assets 1000 then sets promotion parameter values (at 1030) as directed by the user. The promotion parameter values are set as directed by the user for product, point-type, value, image URL, start date, end date, and other parameters related to the promotion being created or updated.

In some embodiments, the promotions process for creating and updating promotion assets 1000 then sets a promotion type (at 1040) for the new or updated promotion. The promotion type is set to an accrual promotion or a redemption promotion, as directed by the user via the admin app. Next, the promotions process for creating and updating promotion assets 1000 receives a user selection of a channel (at 1050) on which the promotion is to be made visible. For example, accrual and redemption promotions described above, by reference to FIG. 6, are defined for a particular promotion definition channel 630 between the issuer and one or more partners.

In some embodiments, the promotions process for creating and updating promotion assets 1000 then executes the smart contract to save the promotion as an asset (at 1060). Then, when a consensus is reached by all of the validating nodes, the promotion asset is included in the next transaction block (at 1070) of the blockchain in the channel.

In some embodiments, the promotions process for creating and updating promotion assets 1000 finalizes the steps by saving the promotion asset on a channel that is visible and exposed to channel participants only (at 1080). Then the promotions process for creating and updating promotion assets 1000 ends.

By way of another example of creating or updating assets, FIG. 11 conceptually illustrates a partner exchange rate process for creating and updating partner exchange rate assets 1100 of the multi-party, multi-point type decentralized loyalty system in some embodiments. As shown in this figure, the partner exchange rate process for creating and updating partner exchange rate assets 1100 starts when the issuer logs into the admin app (at 1110). In this example, an exchange rate asset is created or updated by the issuer in connection with a partner (over a pairwise channel). In particular, the partner exchange rate process for creating and updating partner exchange rate assets 1100 creates or updates an exchange rate for each point-type by partner (at 1120) and then sets buy (purchase) and sell rates for each point-type by partner (at 1130).

In some embodiments, the partner exchange rate process for creating and updating partner exchange rate assets 1100 then creates a pairwise channel between issuer and partner (at 1140) to hold the exchange rate. Next, the partner exchange rate process for creating and updating partner exchange rate assets 1100 executes a smart contract to save the exchange rate as an asset (at 1150). Then, when a consensus is reached by all of the validating nodes, the exchange rate asset is included in the next transaction block (at 1160) in the ledger.

In some embodiments, the partner exchange rate process for creating and updating partner exchange rate assets 1100 saves the exchange rate asset in the pairwise channel defined between the issuer and partner (at 1170). In some embodiments, the partner exchange rate process for creating and updating partner exchange rate assets 1100 limits visibility of the new/updated exchange rate to the issuer and partner connected in the pairwise channel (at 1180). Then the partner exchange rate process for creating and updating partner exchange rate assets 1100 ends.

Turning to another example of creating or updating assets, FIG. 12 conceptually illustrates a member exchange rate process for creating and updating member exchange rate assets 1200 of the multi-party, multi-point type decentralized loyalty system in some embodiments. As shown in this figure, the member exchange rate process for creating and updating member exchange rate assets 1200 starts when the issuer logs into the admin app (at 1210). Unlike the example of the exchange rate created/updated by an issuer in connection with a partner, described above by reference to FIG. 11, the exchange rate asset created or updated by the issuer in this figure is done so in connection with a member.

In some embodiments, the member exchange rate process for creating and updating member exchange rate assets 1200 creates or updates an exchange rate for each point-type for the member (at 1220) and then sets buy (purchase) and sell rates for each point-type for the member (at 1230). In some embodiments, the member exchange rate process for creating and updating member exchange rate assets 1200 then records the member exchange rate as an asset in the main (common) channel (at 1240).

In some embodiments, the member exchange rate process for creating and updating member exchange rate assets 1200 then executes a smart contract to save the new/updated member exchange rate as an asset (at 1250). In some embodiments, the member exchange rate process for creating and updating member exchange rate assets 1200 needs a consensus to be reached by the validating nodes in connection with the ledger in order to confirm the assets and, once confirmed, include in the next transaction block (at 1260) in the chain of transactions stored in the ledger. Next, the member exchange rate process for creating and updating member exchange rate assets 1200 saves the member exchange rate asset in the main (common) channel (at 1270). Then the member exchange rate process for creating and updating member exchange rate assets 1200 makes the member exchange rate visible to the issuer, partners, and members (at 1280). After making the member exchange rate visible, the member exchange rate process for creating and updating member exchange rate assets 1200 of some embodiments ends.

Now, the next several examples, described below by reference to FIGS. 13-17, are processes that demonstrate loyalty member and partner use of applications/integrations that access and allow interaction with the multi-party, multi-point type decentralized loyalty system.

By way of example, FIG. 13 conceptually illustrates a member accrual process for high throughput of point accrual transactions 1300 in some embodiments of the multi-party, multi-point type decentralized loyalty system. As shown in this figure, the member accrual process for high throughput of point accrual transactions 1300 starts with a member performing an activity via software.

In some embodiments, the member accrual process for high throughput of point accrual transactions 1300 starts when a member executes an activity in the mobile application, the web application, or a POS system (at 1305). In some embodiments, the member accrual process for high throughput of point accrual transactions 1300 evaluates the activity against any applicable promotions (at 1310), which is followed by determining points for accrual (at 1315) according to the results of the promotion evaluation (at 1310). In some embodiments, the member accrual process for high throughput of point accrual transactions 1300 returns to the promotion evaluation step (at 1310) and repeats the point accrual determination step (at 1315) repeatedly for any and all applicable promotions.

After evaluating all applicable promotions, the member accrual process for high throughput of point accrual transactions 1300 creates transactions for points accrual from each qualifying promotion (at 1320). In some embodiments, the member accrual process for high throughput of point accrual transactions 1300 creates these point transactions as "assets" that are given a "pending" status (at 1325).

In some embodiments, the member accrual process for high throughput of point accrual transactions 1300 performs a periodic process of sweeping up multiple assets that are in the pending status (at 1330), which is followed by submitting the multiple transactions in the pending status to the smart contract (at 1335) for validation.

In some embodiments, the member accrual process for high throughput of point accrual transactions 1300 executes the smart contract in connection with the multiple transactions in the pending status as a validity check against the partner or issuer wallet for each pending point accrual transaction (at 1340). For example, if the promotion grants ten points to each member that accepts the promotion, and 100 members accept, then the partner or issuer should have at least 1000 points available in their respective wallet.

After the validity is checked and confirmed, the member accrual process for high throughput of point accrual transactions 1300 of some embodiments submits the set of pending transactions as valid transactions to store in a single blockchain transaction (at 1345). In some embodiments, submitting the pending transactions as a set to store in a single blockchain transaction prevents or avoids read-write set consistency issues.

Next, the member accrual process for high throughput of point accrual transactions 1300 of some embodiments sends the transactions to multiple nodes in the main (common) channel which each execute smart contracts to reach a consensus (at 1350) for validation. When thus validated by consensus of these validating nodes, the member accrual process for high throughput of point accrual transactions 1300 then moves the points (as accrued) from the wallet of the partner or issuer to the wallet of each accruing member (at 1355).

In some embodiments, the member accrual process for high throughput of point accrual transactions 1300 then records the transaction in the main (common) channel as an immutable record of the points accrual (at 1360). Then the member accrual process for high throughput of point accrual transactions 1300 ends.

By way of another member usage example of points redemption, FIG. 14 conceptually illustrates a member redemption process for high throughput of point redemption transactions 1400 in some embodiments of the multi-party, multi-point type decentralized loyalty system. As shown in this figure, the member redemption process for high throughput of point redemption transactions 1400 starts when a member selects a redemption offer in the mobile application, the web application, or a POS system (at 1405).

In some embodiments, the member redemption process for high throughput of point redemption transactions 1400 evaluates the redemption promotion for member eligibility (at 1410). If the member is eligible, then the member redemption process for high throughput of point redemption transactions 1400 proceeds to the next step of determining points for the redemption from the promotion evaluation (at 1415).

If the member qualifies for the promotion, and based on the determined points, the member redemption process for high throughput of point redemption transactions 1400 then creates a transaction for points from the qualifying promotion (at 1420). In some embodiments, the member redemption process for high throughput of point redemption transactions 1400 creates the point transactions from qualifying promotion as "assets" in a "pending" state (at 1425).

In some embodiments, the member redemption process for high throughput of point redemption transactions 1400 performs a periodic sweep to aggregate multiple assets (at 1430) that have been designated as being in the pending state (at 1425). In some embodiments, the member redemption process for high throughput of point redemption transactions 1400 then submits the aggregation of multiple transactions in the pending state to the smart contract (at 1435) for validation.

In some embodiments, the member redemption process for high throughput of point redemption transactions 1400 executes the smart contract in connection with the aggregated transactions in the pending state as a validity check against the member wallet for each pending point redemption transaction (at 1440). For example, if the number of points being redeemed by the member is 1000 points, then the wallet of the member needs to have at least 1000 points available in the same point-type being redeemed.

After the validity is checked and confirmed, the member redemption process for high throughput of point redemption transactions 1400 of some embodiments submits the valid aggregation of "pending" state transactions as a single blockchain transaction (at 1445) in order to avoid read-write set consistency issues.

Next, the member redemption process for high throughput of point redemption transactions 1400 of some embodiments sends the transactions to multiple nodes to execute smart contracts to reach a consensus (at 1450) for validation. When the validating nodes reach a consensus, the member redemption process for high throughput of point redemption transactions 1400 then moves the points (as redeemed) from the wallet of the member to the issuer, the partner, or other member wallet for each member seeking to point redemption in the aggregation of transactions (at 1455).

In some embodiments, the member redemption process for high throughput of point redemption transactions 1400 then records each transaction in the main (common) channel as an immutable record of the points redemption (at 1460). Then the member redemption process for high throughput of point redemption transactions 1400 ends.

In another partner usage example of buying/selling points by a partner, FIG. 15 conceptually illustrates a partner points process for buying and selling points by a partner 1500 in some embodiments of the multi-party, multi-point type decentralized loyalty system. As shown in this figure, the partner points process for buying and selling points by a partner 1500 starts when a partner logs into the admin app (at 1510) and proceeds to make a selection of points to sell or points to buy (at 1520).

Based on the selection of points to sell or points to buy, the partner points process for buying and selling points by a partner 1500 executes the smart contract to evaluate the partner point balance (for selling points), the status, and the eligibility (at 1530). Then the partner points process for buying and selling points by a partner 1500 proceeds to the next step at which the smart contract looks up the exchange rate for the points being bought or sold (at 1540).

In some embodiments, the partner points process for buying and selling points by a partner 1500 then proceeds to a step during which the smart contract records a "read" transaction in a pairwise channel to have an audit-capable record of the exchange rate (at 1550). Next, the partner points process for buying and selling points by a partner 1500 of some embodiments provides the partner with the buy amount/sell amount based on the exchange rate (at 1560). If the partner finds the buy amount/sell amount acceptable, then the partner proceeds by executing the transaction (at 1570) as the next step of the partner points process for buying and selling points by a partner 1500.

In some embodiments, the partner points process for buying and selling points by a partner 1500 proceeds forward to a step at which the smart contract submits the transaction in the main (common) channel (at 1580) and cross-referencing the "read" transaction for the audit record. In some embodiments, the partner points process for buying and selling points by a partner 1500 continues forward with the transaction included by validating nodes in the next transaction block and written to the ledger when the validating nodes reach a consensus (at 1590). Finally, the partner points process for buying and selling points by a partner 1500 adjusts the partner wallet for the appropriate point-type bucket (at 1595). Then the partner points process for buying and selling points by a partner 1500 ends.

Turning to another example, FIG. 16 conceptually illustrates a member points process for buying and selling points by a member 1600 in some embodiments of the multi-party, multi-point type decentralized loyalty system. As shown in this figure, the member points process for buying and selling points by a member 1600 starts with member login to the admin app (at 1610). In some embodiments, the member points process for buying and selling points by a member 1600 receives a selection by the member of points to buy or points to sell (at 1620). Next, the member points process for buying and selling points by a member 1600 executes the smart contract to evaluate member point balance (for selling), status, and eligibility (at 1630), which is followed by the smart contract looking up the exchange rate from the exchange rate asset in the main (common) channel (at 1640). Then the smart contract records a "read" transaction in the main (common) channel to have an audit record of the exchange rate (at 1650).

In some embodiments, the member points process for buying and selling points by a member 1600 provides the member, via the admin app, the buy amount/sell amount based on the exchange rate (at 1660). Then the member may execute the transaction (at 1670). When the member executes the transaction (at 1670), the smart contract submits the transaction in the main (common) channel (at 1680) and the member points process for buying and selling points by a member 1600 cross-references the "read" transaction (at 1680).

In some embodiments, the member points process for buying and selling points by a member 1600 then includes the transaction, when consensus is reached by validating nodes, in the next transaction block written to the ledger (at 1690). In some embodiments, the member points process for buying and selling points by a member 1600 then adjusts the member wallet for the appropriate point-type bucket (at 1695). In some embodiments, the member points process for buying and selling points by a member 1600 then ends.

By yet another usage example, FIG. 17 conceptually illustrates a point-type exchange process for members to exchange from one point-type to another point-type 1700 in some embodiments of the multi-party, multi-point type decentralized loyalty system. As shown in this figure, the point-type exchange process for members to exchange from one point-type to another point-type 1700 starts with member login to the admin app (at 1710). In some embodiments, the point-type exchange process for members to exchange from one point-type to another point-type 1700 receives a selection, made by the member interacting with the admin app, of points and point-type to exchange (at 1720). For example, the member may have a wallet with a balance of 100 points of point-type "A", 50 points of point-type "B", 1000 points of point-type "C", and 0 points of point-type "D", and would be able to select a point quantity up to the balance for the selected point-type.

In some embodiments, the point-type exchange process for members to exchange from one point-type to another point-type 1700 executes the smart contract to evaluate member point balance (for exchange), as well as status, and eligibility (at 1730). Next, the smart contract looks up the exchange rate from the asset (exchange rate asset) in the main (common) channel (at 1740) for source to destination point-type. After looking up the exchange rate, the smart contract then records a "read" transaction to record the source point-type to default as well as to record default to destination point-type (at 1750).

In some embodiments, the point-type exchange process for members to exchange from one point-type to another point-type 1700 continues forward to the next step at which the smart contract computes the destination point amount (at 1760). In some embodiments, the point-type exchange process for members to exchange from one point-type to another point-type 1700 then continues with the member executing the transaction (at 1770). When the member executes the transaction (at 1770), the smart contract submits the transaction in the main (common) channel (at 1780) while the point-type exchange process for members to exchange from one point-type to another point-type 1700 cross-references the "read" transaction identifiers (at 1780).

In some embodiments, the point-type exchange process for members to exchange from one point-type to another point-type 1700 then includes the transaction, when a consensus is reached by the validating nodes, in the next transaction block written to the ledger (at 1790). In some embodiments, the point-type exchange process for members to exchange from one point-type to another point-type 1700 then adjusts the member wallet for both the source point buck and the destination point bucket (at 1795). In some embodiments, the point-type exchange process for members to exchange from one point-type to another point-type 1700 then ends.

Additionally, the multi-party, multi-point type decentralized loyalty system for promotion and point issuance using a permission-based distributed ledger can be adapted and configured to allow a set of participants to advertise goods and services for a set of points, that can be securely exchanged between the participants without the problem of double spend. The ability to create promotions which are securely stored in the ledger can be extended to members and not be restricted to the issuer and partner. This creates a completely new business opportunity to expand the usage of loyalty points.

The above-described embodiments of the invention are presented for purposes of illustration and not of limitation. Nevertheless, the examples above demonstrate that allowing issuers and partners access to the rules of a loyalty system in the form of promotions, exchange rates, and other assets and parameters defined in a distributed, immutable ledger and providing consumers or loyalty members accrual and redemption transaction processes which are also recorded in the distributed ledger blockchain allows for loyalty system operation to be performed entirely in a decentralized fashion.

Additionally, details of cryptography and cryptographically linking the chain of transaction blocks stored in the immutable distributed ledger are well known in the field. As a matter of practice, the encryption standards employed for encrypting the transaction blocks of the blockchain (as stored in the immutable distributed ledger) are typically highly secure encryption standards. In some deployments at present, the encryption standards pertaining to the embodiments described in this specification are no less than 256 bit encryption, such as SHA-256 or AES-256. Enhanced encryption algorithms, processes, standards, mechanisms, modules, and implementations are fully supported beyond 256 bit encryption. For instance, embodiments described herein support 512 bit encryption standards, and even higher encryption standards that exist at the present time, as well as future enhanced encryption standards.

Also, the methods and processes described above involve one or more computing devices (computers, servers, mobile devices, etc.). Specifically, the processes described above by reference to FIGS. 9 through 17 may be implemented as programs, modules, applications, and/or scripts (referred collectively and individually by the term "software") which run on one or more processing unit(s) of the computing devices to carry out instructions for performing the steps and operations of the processes. Also, the examples and descriptions above are not limited to only the steps of these processes or their implementations and, therefore, a person skilled in the relevant art would appreciate that such implementations are only exemplary, and not to be construed as the only implementations of the system and processes of the inventive embodiments described herein.

Furthermore, in this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

By way of example, FIG. 18 conceptually illustrates an electronic system 1800 with which some embodiments of the invention are implemented. The electronic system 1800 may be a computer, a server, a mobile computing device, a tablet computing device, or any other sort of electronic device. Such an electronic system 1800 includes various types of computer readable media and interfaces for various other types of computer readable media. Electronic system 1800 includes a bus 1805, processing unit(s) 1810, a system memory 1815, a read-only memory 1820, a permanent storage device 1825, input devices 1830, output devices 1835, and a network 1840.

The bus 1805 collectively represents all system, peripheral, and chipset buses that communicatively connect the numerous internal devices of the electronic system 1800. For instance, the bus 1805 communicatively connects the processing unit(s) 1810 with the read-only memory 1820, the system memory 1815, and the permanent storage device 1825.

From these various memory units, the processing unit(s) 1810 retrieves instructions to execute and data to process in order to execute the processes of the invention. The processing unit(s) may be a single processor or a multi-core processor in different embodiments.

The read only memory (ROM) 1820 stores static data and instructions that are needed by the processing unit(s) 1810 and other modules of the electronic system. The permanent storage device 1825, on the other hand, is a read-and-write memory device. This device is a non-volatile memory unit that stores instructions and data even when the electronic system 1800 is off. Some embodiments of the invention use a mass-storage device (such as a magnetic or optical disk and its corresponding disk drive) as the permanent storage device 1825.

Other embodiments use a removable storage device (such as a flash drive) as the permanent storage device 1825. Like the permanent storage device 1825, the system memory 1815 is a read-and-write memory device. However, unlike the permanent storage device 1825, the system memory 1815 is a volatile read-and-write memory, such as a random access memory. The system memory 1815 stores some of the instructions and data that the processor needs at runtime. In some embodiments, the invention's processes are stored in the system memory 1815, the permanent storage device 1825, and/or the read only memory 1820. For example, the various memory units include instructions for processing appearance alterations of displayable characters in accordance with some embodiments. From these various memory units, the processing unit(s) 1810 retrieves instructions to execute and data to process in order to execute the processes of some embodiments.

The bus 1805 also connects to the input and output devices 1830 and 1835. The input devices enable the user to communicate information and select commands to the electronic system. The input devices 1830 include alphanumeric keyboards and pointing devices (also called "cursor control devices"). The output devices 1835 display images generated by the electronic system 1800. The output devices 1835 include printers and display devices, such as liquid crystal displays (LCD) and organic light emitting diode (OLED) displays. Some embodiments include electronic systems and/or devices that function as both input and output devices, such as touchscreen displays on tablet computing device, computer monitors, and mobile devices.

Finally, as shown in FIG. 18, bus 1805 also couples electronic system 1800 to a network 1840 through a network adapter (not shown). In this manner, the computer can be a part of a network of computers (such as a local area network ("LAN"), a wide area network ("WAN"), or an intranet), or a network of networks (such as the Internet). Any or all components of electronic system 1800 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 9-17 conceptually illustrate processes in which the specific operations of these processes may not be performed in the exact order shown and described. Specific operations may not be performed in one continuous series of operations, and different specific operations may be performed in different embodiments. Furthermore, the processes could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A multi-party, multi-point type decentralized loyalty system for promotion and point issuance using a permission-based distributed ledger comprising:
   a plurality of node computers configured to endorse loyalty transactions in a loyalty program;
   a software-implemented permission-based distributed ledger protocol with a plurality of nodes associated with the plurality of node computers to endorse loyalty transactions in the loyalty program;
   an immutable distributed ledger stored on each of a plurality of networked computing devices, the immutable distributed ledger comprising a chain of transaction blocks that record transactions when the plurality of nodes associated with the plurality of node computers endorse the loyalty transactions in the loyalty program, wherein the chain of transaction blocks are cryptographically linked to each other to form a block-chain;
   an asset state database of at least one server data storage that stores states of assets for the loyalty program;
   a common channel comprising the immutable distributed ledger and the asset state database, wherein the common channel allows a plurality of permissioned nodes in the plurality of nodes associated with the loyalty program to write loyalty transactions to the immutable distributed ledger, wherein the plurality of permissioned nodes comprise a particular issuer, a set of partners, and a plurality of particular loyalty members;
   a common chaincode of smart contracts associated with the common channel, wherein the common chaincode of smart contracts specifies rules that govern modifications of assets for the loyalty program and rules that govern the plurality of permissioned nodes in writing loyalty transactions to the immutable distributed ledger and referenced in a plurality of loyalty member digital wallets corresponding to the plurality of particular loyalty members;

a software application that implements a plurality of smart contracts for a plurality of different chaincodes of a plurality of different loyalty programs, wherein the software application enables definition, specification, and modification of rules by which assets of each loyalty program are exchanged, stored, modified, and distributed, wherein the plurality of nodes participating in the common channel and a plurality of other channels utilize the software application to endorse and approve loyalty transactions in the plurality of different loyalty programs according to the rules as defined, specified, and modified, wherein exchange of assets between different loyalty programs is enabled through validating nodes that check the rules in the plurality of smart contracts for the plurality of different loyalty programs, wherein the plurality of other channels comprise (i) a pairwise set of channels between an issuing entity and a plurality of pairwise partner entities that hold point type-to-point type exchange rates and point type-to fiat currency exchange rates with visibility of rate limited to only the issuing entity and each pairwise partner entity in the plurality of pairwise partner entities and (ii) a plurality of accrual and redemption channels comprising an accrual promotion channel between a promotion issuer and a first plurality of promotion partners and a redemption promotion channel between the promotion issuer and a second plurality of promotion partners, wherein accrual promotions are held in the accrual promotion channel and saved as accrual promotion assets in an accrual promotion asset state database and redemption promotions are held in the redemption promotion channel and saved as redemption promotion assets in a redemption promotion asset state database, wherein the accrual promotions are visible only to the first plurality of promotion partners and the redemption promotions are visible only to the second plurality of promotion partners;

a blockchain transaction extract-translate-load (ETL) server that is communicably connected to the plurality of node computers and accessible through all channels;

a relational database that is communicably connected to the ETL server;

a blockchain transaction ETL engine that runs on the ETL server and is configured to listen to every transaction block written to the blockchain and extract data from the transaction block to store in the relational database; and a plurality of external applications comprising (i) an admin computer program that runs on an admin server to administer and maintain the loyalty program, (ii) a mobile application that runs on mobile devices to accrue and redeem loyalty program points and to view loyalty program point balances, and (iii) a point of sale (POS) application integration with a particular point of sale (POS) system.

2. The multi-party, multi-point type decentralized loyalty system of claim 1 further comprising an application programming interface (API) implemented in software that enables the plurality of external applications to access the smart contracts of the chaincode associated with the common channel.

3. The multi-party, multi-point type decentralized loyalty system of claim 1, wherein the assets for the loyalty program comprise accounts, point types, wallets with point balances of different point types, promotions, and exchange rates.

4. The multi-party, multi-point type decentralized loyalty system of claim 3, wherein all modifications of assets allowed by the rules of the smart contracts in the chaincode are stored as immutable transaction blocks in the immutable distributed ledger, wherein the immutable distributed ledger is updated, validated, and stored as updated when validated on each of the plurality of networked computing devices.

5. The multi-party, multi-point type decentralized loyalty system of claim 1, wherein the plurality of permissioned nodes further comprise a second issuer, a second set of partners, and a second plurality of loyalty members.

6. The multi-party, multi-point type decentralized loyalty system of claim 1, wherein the particular issuer is associated with a particular issuer wallet that holds loyalty program point balances for the particular issuer and the second issuer is associated with a second issuer wallet that holds loyalty program point balances for the second issuer, wherein each partner in the set of partners is associated with only one partner wallet in a set of partner wallets assigned to the set of partners, wherein each partner wallet is configured to hold loyalty program point balances only for the assigned partner in the set of partners, wherein each particular loyalty member is associated with a corresponding loyalty member digital wallet that holds loyalty program point balances only for that particular loyalty member, wherein the validating nodes check the rules of the smart contracts in the chaincode to transfer points from the particular issuer wallet to each of the set of partner wallets assigned to the set of partners and to transfer points to each of the plurality of loyalty member digital wallets corresponding to the plurality of particular loyalty members.

7. The multi-party, multi-point type decentralized loyalty system of claim 1, wherein the relational database communicably connected to the blockchain transaction ETL engine and resides on the ETL server stores data extracted from each transaction block of the blockchain in a searchable format.

8. The multi-party, multi-point type decentralized loyalty system of claim 1, wherein each channel is allocated a separate relational database and a separate channel blockchain transaction ETL engine that is configured to listen to every transaction block written to a corresponding blockchain for the channel and extract data from the transaction block to store in the separate relational database allocated for the channel.

9. The multi-party, multi-point type decentralized loyalty system of claim 8, wherein the plurality of external applications are configured to search and analyze the data stored in the relational database allocated to the common channel and each separate relational database allocated to the separate channels.

10. The multi-party, multi-point type decentralized loyalty system of claim 1 further comprising a pairwise exchange rate channel between an issuer and a partner.

11. The multi-party, multi-point type decentralized loyalty system of claim 10, wherein the pairwise exchange rate channel holds exchange rate assets that define exchange rates (i) between different point types and (ii) between fiat currencies and point types.

12. The multi-party, multi-point type decentralized loyalty system of claim 1 further comprising a promotion definition channel between an issuer and a plurality of partners.

13. The multi-party, multi-point type decentralized loyalty system of claim 12, wherein the promotion definition channel holds accrual and redemption promotion assets that define (i) accrual of points by partners in connection with a point accrual promotion under the loyalty program and (ii) redemption of points by partners in connection with a point redemption promotion under the loyalty program.

14. The multi-party, multi-point type decentralized loyalty system of claim 1, wherein the plurality of nodes associated with the plurality of node computers further endorse transactions defining smart contracts for assets and transactions invoking smart contracts defined for assets.

* * * * *